(12) United States Patent
Ali et al.

(10) Patent No.: US 12,536,118 B2
(45) Date of Patent: Jan. 27, 2026

(54) TILED IN-MEMORY COMPUTING ARCHITECTURE

(71) Applicant: Rain Neuromorphics Inc., San Francisco, CA (US)

(72) Inventors: Nawab Ali, Bellingham, WA (US); Muzaffer Kal, Redmond, WA (US); Alexander Almela Conklin, San Jose, CA (US); Burak Erbagci, San Jose, CA (US); Cagri Eryilmaz, San Francisco, CA (US); Mohammed Elneanaei Abdelmoneem Fouda, Irvine, CA (US)

(73) Assignee: RAIN NEUROMORPHICS INC., San Francisco, CA (US)

( * ) Notice: Subject to any disclaimer, the term of this patent is extended or adjusted under 35 U.S.C. 154(b) by 0 days.

(21) Appl. No.: 18/789,480

(22) Filed: Jul. 30, 2024

(65) Prior Publication Data

US 2025/0045224 A1 Feb. 6, 2025

Related U.S. Application Data

(60) Provisional application No. 63/532,254, filed on Aug. 11, 2023, provisional application No. 63/530,229, (Continued)

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC .............................. G06F 13/28; G06F 2213/28
(Continued)

(56) References Cited

U.S. PATENT DOCUMENTS 11,347,477 B2 5/2022 Sumbul
11,475,300 B2 10/2022 Yao
(Continued)

FOREIGN PATENT DOCUMENTS

WO 2020190776 9/2020
WO 2022029026 2/2022

OTHER PUBLICATIONS

Kim et al., Moneta: A Processing-In-Memory-Based Hardware Platform for the Hybrid Convolutional Spiking Neural Network with Online Learning, Frontiers in Neuroscience, vol. 16, Apr. 11, 2022.
(Continued)

*Primary Examiner* — Titus Wong
(74) *Attorney, Agent, or Firm* — FINNEGAN, HENDERSON, FARABOW, GARRETT & DUNNER LLP

(57) ABSTRACT

A compute tile is described. The compute tile includes compute engines and a general-purpose (GP processor coupled with the compute engines. Each of the compute engines includes a compute-in-memory (CIM) hardware module. The CIM hardware module is configured to store weights corresponding to a matrix and to perform a vector-matrix multiplication (VMM) for the matrix. The GP processor is configured to control the compute engines, to receive output of the VMM for the matrix from the compute engines, and to perform a nonlinear operation on the output. The compute engines are addressable by data movement initiators. Data may be moved to and/or from the compute engines in data paths that bypass the GP processor.

21 Claims, 11 Drawing Sheets

Related U.S. Application Data filed on Aug. 1, 2023, provisional application No. 63/529,921, filed on Jul. 31, 2023.

(58) Field of Classification Search
USPC .......................................................... 710/22
See application file for complete search history.

(56) References Cited

U.S. PATENT DOCUMENTS

| | | | |
|---|---|---|---|
| 2009/0177867 A1* | 7/2009 | Garde | G06F 15/8015 |
| | | | 712/214 |
| 2010/0174883 A1* | 7/2010 | Lerner | G06F 15/8015 |
| | | | 712/E9.002 |
| 2015/0106311 A1 | 4/2015 | Birdwell | |
| 2018/0189631 A1 | 7/2018 | Sumbul | |
| 2019/0102170 A1 | 4/2019 | Chen | |
| 2019/0102359 A1 | 4/2019 | Knag | |
| 2019/0179795 A1 | 6/2019 | Huang | |
| 2019/0205741 A1* | 7/2019 | Gupta | G06F 9/3853 |
| 2019/0340486 A1* | 11/2019 | Mills | G06F 7/5443 |
| 2019/0348110 A1 | 11/2019 | Sinangil | |
| 2019/0362227 A1 | 11/2019 | Seshadri | |
| 2020/0057938 A1 | 2/2020 | Lu | |
| 2020/0207656 A1 | 7/2020 | Yoshioka | |
| 2020/0293284 A1* | 9/2020 | Vantrease | G06N 3/08 |
| 2020/0320403 A1 | 10/2020 | Daga | |
| 2020/0410337 A1* | 12/2020 | Huang | G06N 3/04 |
| 2021/0097431 A1 | 4/2021 | Olgiati | |
| 2021/0158132 A1* | 5/2021 | Huynh | G06N 3/04 |
| 2021/0224185 A1 | 7/2021 | Zhou | |
| 2021/0343343 A1 | 11/2021 | Teague | |
| 2022/0004497 A1 | 1/2022 | Willcock | |
| 2022/0019880 A1 | 1/2022 | Dasgupta | |
| 2022/0114270 A1* | 4/2022 | Wang | G06F 15/7807 |
| 2022/0138286 A1* | 5/2022 | Zage | H04L 63/0428 |
| | | | 726/26 |
| 2022/0164916 A1* | 5/2022 | Nurvitadhi | G06N 3/084 |
| 2022/0207293 A1 | 6/2022 | Yao | |
| 2022/0207656 A1 | 6/2022 | Yao | |
| 2022/0244916 A1 | 8/2022 | Lee | |
| 2022/0301605 A1 | 9/2022 | Mirhaj | |
| 2022/0309328 A1 | 9/2022 | Saxena | |
| 2022/0318610 A1 | 10/2022 | Seo | |
| 2022/0414432 A1 | 12/2022 | Banitalebi Dehkordi | |
| 2023/0014565 A1* | 1/2023 | Ray | G06F 12/0215 |
| 2023/0045840 A1 | 2/2023 | Chih | |
| 2023/0047364 A1 | 2/2023 | Badaroglu | |
| 2023/0074229 A1* | 3/2023 | Jia | G06F 15/7821 |
| 2023/0138695 A1 | 5/2023 | Kumar | |
| 2023/0146647 A1 | 5/2023 | Byeon | |
| 2023/0206044 A1 | 6/2023 | Ma | |
| 2023/0259456 A1* | 8/2023 | Verma | G06F 15/7821 |
| | | | 711/157 |
| 2023/0297580 A1 | 9/2023 | Sheng | |
| 2023/0316060 A1 | 10/2023 | Jain | |
| 2023/0359894 A1 | 11/2023 | Kim | |
| 2024/0094986 A1 | 3/2024 | Lyubomirsky | |
| 2024/0134606 A1 | 4/2024 | Yi | |
| 2024/0169201 A1 | 5/2024 | Seok | |

OTHER PUBLICATIONS

Korthikanti et al., Reducing Activation Recomputation in Large Transformer Models, May 10, 2022, pp. 1-17.

Lee et al., A 12nm 121-TOPS/W 41.6-TOPS/mm2 All Digital Full Precision SRAM-based Compute-in-Memory with Configurable Bit-width for AI Edge Applications, 2022 Symposium on VLSI Technology & Circuits Digest of Technical Papers, pp. 24-25.

Song et al., PipeLayer: A Pipelined ReRAM-Based Accelerator for Deep Learning, 2017.

Lin et al., A Novel Voltage-Accumulation Vector-Matrix Multiplication Architecture using Resistor-Shunted Floating Gate Flash Memory Device for Low-Power and High-Density Neural Network Applications, 2018 IEEE International Electron Devices Meeting (IEDM), Dec. 5, 2018, 4 pages.

Chih et al., 16.4 An 89TOPS/W and 16.3TOPS/mm2 All-Digital SRAM-Based Full-Precision Compute-In Memory Macro in 22nm for Machine-Learning Edge Applications, In Proc. IEEE Int. Solid-State Circuits Conf.(ISSCC), vol. 64, 2021, pp. 252-254.

Li et al., A Precision-Scalable Energy-Efficient Bit-Split-and-Combination Vector Systolic Accelerator for NAS-Optimized DNNs on Edge, 2022 Design, Automation & Test in Europe Conference & Exhibition, 2022, pp. 730-735.

Mori et al., A 4nm 6163-TOPS/W/b 4790-TOPS/mm2/b SRAM Based Digital-Computing-in-Memory Macro Supporting Bit-Width Flexibility and Simultaneous MAC and Weight Update, In 2023 IEEE International Solid-State Circuits Conference (ISSCC), Feb. 2023, pp. 132-134.

* cited by examiner

TILED IN-MEMORY COMPUTING ARCHITECTURE

CROSS REFERENCE TO OTHER APPLICATIONS

This application claims priority to U.S. Provisional Patent Application No. 63/529,921 entitled IMPROVED TILED IN-MEMORY COMPUTING ARCHITECTURE filed Jul. 31, 2023, U.S. Provisional Patent Application No. 63/530,229 entitled METHOD AND ARCHITECTURE FOR EFFICIENT COMPUTE-IN-MEMORY ACCELERATORS filed Aug. 1, 2023, and U.S. Provisional Patent Application No. 63/532,254 entitled SYSTEM WITH INCREASED COMPUTE-IN-MEMORY WEIGHTS filed Aug. 11, 2023, all of which are incorporated herein by reference for all purposes.

BACKGROUND OF THE INVENTION

Artificial intelligence (AI), or machine learning, utilizes learning networks (e.g. deep neural networks) loosely inspired by the brain in order to solve problems. Learning networks typically include layers of weights that weight signals (mimicking synapses) interleaved with activation layers that apply activation functions to the signals (mimicking neurons). Thus, a weight layer provides weighted input signals to an activation layer. Neurons in the activation layer operate on the weighted input signals by applying some activation function to the input signals and provide output signals corresponding to the statuses of the neurons. The output signals from the activation layer are provided as input signals to the next weight layer, if any. This process may be repeated for the layers of the network. Learning networks are thus able to reduce complex problems to a set of weights and the applied activation functions. The structure of the network (e.g., number of layers, connectivity among the layers, dimensionality of the layers, the type of activation function, etc.) are together known as a model. Learning networks can leverage hardware, such as graphics processing units (GPUs) and/or AI accelerators, which perform operations usable in machine learning in parallel. Such tools can dramatically improve the speed and efficiency with which data-heavy and other tasks can be accomplished by the learning network.

In order to be used in data-heavy tasks and/or other applications, the learning network is trained prior to its use in an application. Training involves optimizing a configuration of the high-dimensional and nonlinear set of weights. In other words, the weights in each layer are determined, thereby identifying the parameters of a model. Supervised training may include evaluating the final output signals of the last layer of the learning network based on a set of target outputs (e.g., the desired output signals) for a given set of input signals and adjusting the weights in one or more layers to improve the correlation between the output signals for the learning network and the target outputs. Once the correlation is sufficiently high, training may be considered complete. The model can then be deployed for use. Deploying the model may include copying the weights into a memory (or other storage) of the device on which the model is desired to be used. For example, the weights may be copied into the AI accelerator or storage for the GPU.

Although training can result in a learning network capable of solving challenging problems, determining solutions even with an optimized model may be time-consuming. Use of an AI accelerator may reduce the time required for the machine learning model to provide a solution. However, further improvements are desired. For example, an AI accelerator may only be optimized for general use, rather than for a particular model. As a result, performance of the learning network may be poorer than desired. In addition, a model may be desired to be re-trained for a different purpose and/or a different model may be desired to be used with the same AI accelerator. This may adversely impact efficiency of the AI accelerator and/or require in-situ training as well as inference. The AI accelerator is also desired to be scalable. For example, a hardware accelerator configured to perform one (or even ten) vector-matrix multiplications implemented in hardware (e.g. in a crossbar array) may only operate on a small number of weights in the model. Thus, large numbers vector-matrix multiplications implemented on different hardware are desired to be combined. Accordingly, what is desired is an improved technique for training and/or using learning networks.

BRIEF DESCRIPTION OF THE DRAWINGS

Various embodiments of the invention are disclosed in the following detailed description and the accompanying drawings.

DETAILED DESCRIPTION

Figure 1:
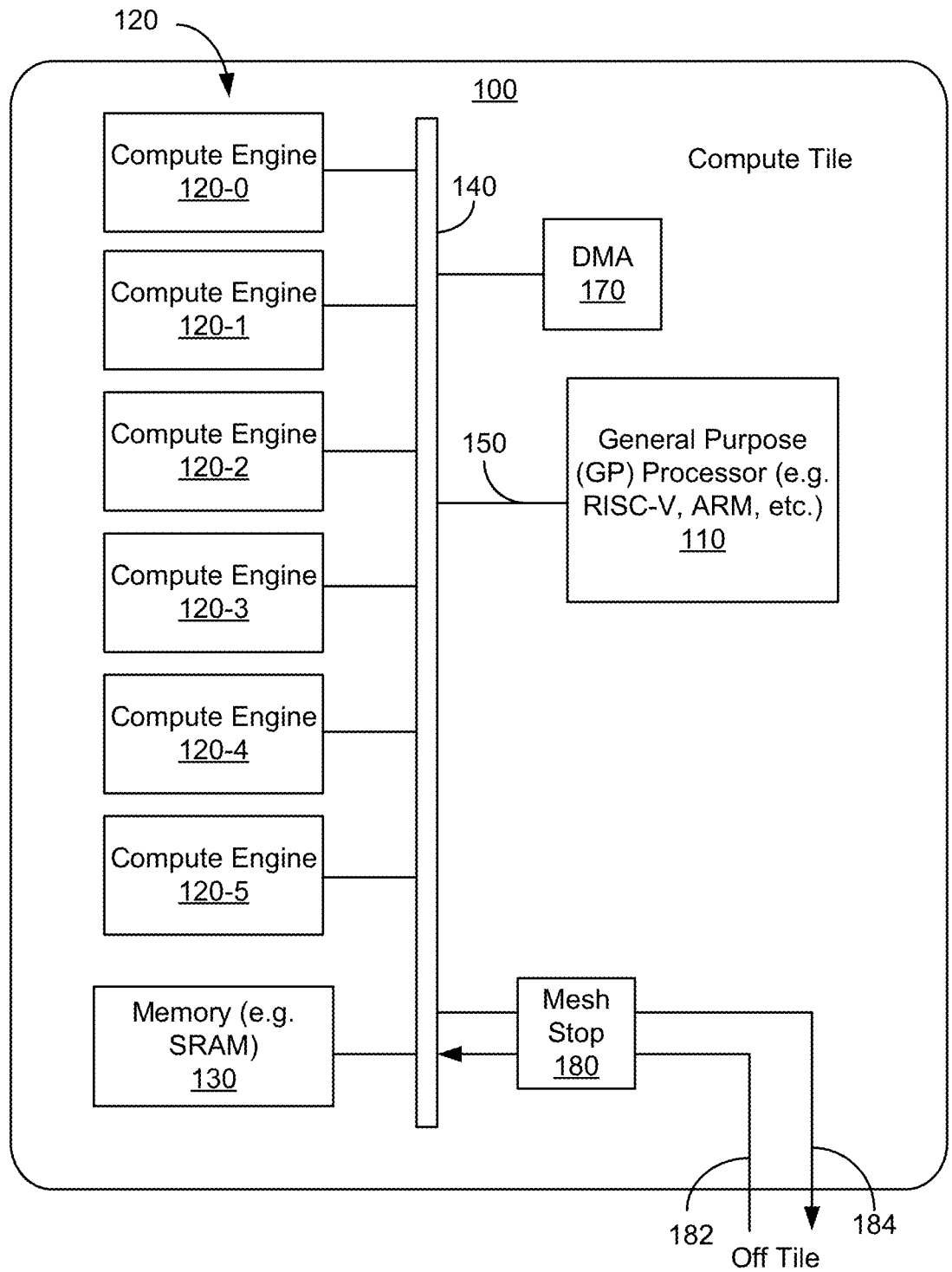
FIG. 1 is a diagram depicting an embodiment of a system usable in an AI accelerator and having an efficient architecture.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A compute tile is described. The compute tile includes compute engines and at least one general-purpose (GP) processor coupled with the compute engines. Each of the compute engines includes a compute-in-memory (CIM) hardware module. The CIM hardware module is configured to store weights corresponding to a matrix. The weights stored in the CIM hardware module may be a portion of the elements or all elements of the matrix. The CIM hardware module is also configured to perform a vector-matrix multiplication (VMM) for the matrix. Thus, the CIM hardware module may perform a VMM of an input vector provided to the compute engine and the weights stored by the CIM hardware module. The GP processor is configured to control the compute engines, to receive output of the VMM for the matrix from the compute engine(s), and to perform a nonlinear operation on the output. The compute engines are addressable by data movement initiators. In some embodiments, the compute engines and the data movement initiators are configured to move data to the compute engines in data path(s) that bypass the GP processor. Thus, the GP processor is excluded from at least some of the data path(s) to the compute engines. In some embodiments, the compute engines and data movement targets are configured to move data from the compute engines in data path(s) that bypass the GP processor of the compute tile. In some embodiments, some data path(s) to and/or from the compute engines may include the GP processor. For example, the output of the VMMs may be provided to the GP processor of the compute tile.

The compute tile may include a direct memory access (DMA) unit. The data movement initiators may include the DMA unit and/or a component on an additional compute tile coupled with the compute tile. The compute tile may include a local memory coupled with the compute engines and the GP processor. In such embodiments, the DMA unit is configured to transfer data between the local memory and the compute engines in a data path that bypasses the GP processor. The compute tile may also include a data conversion engine coupled with the compute engines. The data conversion engine is configured to convert data transferred to the compute engines from a first format to a second format. The data conversion engine may include a BFloat-Integer format converter and/or a reshape engine. The reshape engine may be configured to perform functions such as padding the data.

In some embodiments, a local memory is coupled with the compute engines through a first bus. The GP processor is coupled with the compute engines through a second bus different from the first bus. The compute tile may also include a main bus coupled with the local memory and the GP processor. In some embodiments, a local memory is coupled with the compute engines by a first bus. In such embodiments, the compute tile may also include a main bus coupled with the local memory, the plurality of compute engines, and the GP processor, the GP processor being coupled with the plurality of compute engines and the local memory through the main bus. In some such embodiments, the compute engines are coupled to the main bus through an interconnect having internal queueing.

In some embodiments, each of the compute engines may include a local compute engine memory, and a cache controller. The local compute engine memory has a first memory density. The cache controller is coupled with the local compute engine memory. The CIM hardware module is coupled with the cache controller and has a second memory density less than the first memory density.

A system including a plurality of compute tiles is described. Each of the compute tiles includes compute engines and a general-purpose (GP) processor. Each compute engine includes a compute-in-memory (CIM) hardware module. The CIM hardware module stores weights corresponding to a matrix. The CIM hardware module is configured to perform a vector-matrix multiplication (VMM) for the matrix. The GP processor is coupled with the compute engines and is configured to control the compute engines, to receive output of the VMM for the matrix from each compute engine, and to perform a nonlinear operation on the output. The compute engines are addressable by data movement initiators on the compute tiles. The data movement initiators are configured to move data to the compute engines on a compute tile in data path(s) that bypass the GP processor on the compute tile. In some embodiments, therefore, the GP processor is excluded from the data path(s) to the compute engine(s).

A method of using a compute tile is described. The compute tile is one of multiple compute tiles. Each compute tile includes multiple compute engines and a general-purpose (GP) processor coupled with the compute tiles. The method includes providing, to at least one compute engine on the compute tile, an input vector. The compute engine(s) store weights corresponding to a matrix. Each compute engine includes a compute-in-memory (CIM) hardware module. The CIM hardware module stores the weights and is configured to perform a vector-matrix multiplication (VMM) for the matrix. The compute engine(s) perform a VMM for the input vector and the matrix to provide an output. The method also includes applying, by the GP processor, a function to the output. The GP processor is configured to control the compute engines. The compute engines are addressable by data movement initiators such that providing the input vector includes providing the input vector to the compute engine(s) in a data path that bypasses the GP processor.

In some embodiments, the method includes moving data from the compute engine. In such embodiments, the compute engines and data movement targets are configured such that the moving the data from the plurality of compute engines is in at least one data path bypassing the GP processor. In some embodiments, providing the input vector further includes using at least one of a direct memory access (DMA) unit, the data movement initiators including the DMA unit, or a component on an additional compute tile coupled with the compute tile.

The method may include converting, using a data conversion engine coupled with the compute engines and configured to convert data transferred to the compute engines from a first format to a second format. A local memory may be coupled with the plurality of compute engines through a first bus, the GP processor is coupled with the plurality of compute engines through a second bus different from the first bus, and a main bus is coupled with the local memory and the GP processor.

A local memory may be coupled with the compute engines by a first bus. A main bus is coupled with the local memory, the compute engines, and the GP processor. The GP processor is coupled with the plurality of compute engines and the local memory through the main bus. In some such embodiments, the compute engines are coupled to the main bus through an interconnect having an internal queueing. In some embodiments, each of the compute engines is further coupled with a local compute engine memory having a first memory density and a cache controller coupled with the local compute engine memory. The CIM hardware module is coupled with the cache controller and has a second memory density less than the first memory density.

FIG. 1 is a diagram depicting an embodiment of system 100 usable in a learning network. System 100 is a compute tile and may be considered to be an artificial intelligence (AI) accelerator having an efficient architecture. Compute tile (or simply "tile") 100 may be implemented as a single integrated circuit. Compute tile 100 includes a general purpose (GP) processor 110, compute engines 120-0 through 120-5 (collectively or generically compute engines 120), memory 130, and direct memory access unit (DMA) 170. Although six compute engines 120 are shown, in other embodiments another number may be included. GP processor 110 is shown as being coupled with compute engines 120 via interconnect (or other connector) 140 and bus 150. In some embodiments, interconnect 140 may be an Advanced extensible Interface (AXI interconnect) or may be another interconnect or bus. In other embodiments, GP processor 110 may be connected with compute engines 120 in another manner. In some embodiments, compute tile 100 may include on-tile memory 130. Memory 130 may be or include a static random access memory (SRAM) and/or a high bandwidth memory (HBM). In other embodiments, memory 130 may be omitted. Also depicted is optional mesh stop 180 used in communicating off tile. Mesh stop 180 provides an interface between compute tile 100 and the fabric of a mesh network that includes compute tile 100. For example, communication with other components on other compute tile(s) may take place through the connectors coupled with mesh stop 180. In some embodiments, mesh stop 180 may be omitted and mesh input 182 and mesh output 184 may simply be used. Other components, for example a cache or another additional memory, module(s) for applying activation functions, modules for moving data, and/or other modules, may be present in compute tile 100 in some embodiments. GP processor 110, compute engines 120, on-tile memory 130, DMA 170, and mesh stop 180 are coupled through interconnect 140. Thus, data may be more readily moved between components 110, 120, 130, 150, 160, and 180 via interconnect 140.

In some embodiments, GP processor 110 is a reduced instruction set computer (RISC) processor. For example, GP processor 110 may be a RISC-V processor or ARM processor. In other embodiments, different and/or additional general purpose processor(s) may be used. The GP processor 110 provides control instructions to compute engines 120. GP processor 110 implements instruction set(s) used in controlling compute engines 120. GP processor 110 provides the commands to compute engines 120 and controls at least some of the data movement to and/or from compute engines 120. GP processor 110 may thus function as part of a control plane for (i.e. providing commands and controlling the data path) compute engines 120 and tile 100. For example, GP processor 110 may instruct DMA unit 170 to move data between memory 130 and compute engine(s) 120, may instruct compute engine(s) 120 to perform a VMM on the data provided from memory, and may load the output of the VMM from compute engine(s) 120.

In some embodiments, data is moved from memory 130 or another source to compute engine(s) 120 in a data path that bypasses GP processor 110. Stated differently, GP processor 110 is excluded from the data path for at least some data movement operations for compute engines 120. For example, data may be sent from memory 130 to compute engine 120 via an interconnect 140. Similarly, data may be sent from compute tile 100 (e.g. via connector 182) to compute engine(s) 120 via interconnect 140. GP processor 110 may direct this flow of data, but may not store the data being moved (i.e. may not be in the data path). For example, GP processor 110 may retrieve weight data from compute tile 100 (e.g. in DRAM that is not shown) via mesh stop 180 and/or mesh in 182 and load the weights directly to compute engine(s) 120 (e.g. into a weight input buffer in compute engine(s) 120). Similarly, DMA 170 may access an input vector (or activation) in memory 130 and load the activation into compute engine(s) 120 for a VMM to be performed. Data may be moved directly into memory 130 from compute engine(s) 120, off-tile or another component in a similar manner.

In some embodiments, data is moved from compute engine(s) 120 to a target in a data path that bypasses GP processor 110. Stated differently, GP processor 110 is excluded from the data path for at least some data movement operations for compute engines 120. For example, data may be sent from compute engine 120 to memory 130 or mesh stop 180 via buses 150. GP processor 110 may direct this flow of data, but may not store the data being moved (i.e. may not be in the data path). For example, DMA unit 170 may be directed by GP processor 110 to retrieve weight data from compute engine(s) 120 and store the weights off tile (e.g. via mesh stop 180 and/or mesh out 184). Similarly, GP processor 110 may access weight data or the output of the VMM in compute engine(s) 120 and store the data in memory 130. Data may be moved directly from compute engine(s) 120 to memory 130, off-tile, or another component in a similar manner. Thus, data movement to and/or from compute engine(s) 120 may bypass GP processor 110. In some embodiments, data movement to and/or from memory 130 or other components of compute tile 110 may also bypass GP processor 110. In such embodiments, for example, GP processor 110, DMA 170, and mesh stop 180 (and/or mesh_in 182 and mesh_out 184) may be initiators of data movement. The sources of data may be mesh stop 180 and/or mesh_in 182 (for data off of compute tile 100 such as compute engine(s) or memory of another compute tile), memory 130, or compute engine(s) 120. The targets of the data movement may be compute engine(s) 120, memory 130, and/or mesh stop 180 and/or mesh_out 184 (for data stored off of compute tile 100). Consequently, data may be moved to and/or from components of compute tile 100, including compute engines 120, without first being stored in GP processor 110. Stated differently, the data path for data movement involving compute engine(s) 120 may bypass (i.e. exclude) GP processor 110.

Some data movement for compute engines 120 includes GP processor 110 in the data path. For example, data from memory 130 may be provided to a vector register file (not shown) of GP processor 110 and then provided from GP processor 110 to the appropriate compute engine(s) 120. However, as discussed above, GP processor 110 may instead be bypassed in some instances. Once compute engines 120 have performed their functions, the output may be provided to GP processor 110. For example, the GP processor 110 may be used to apply the activation function to the output of the VMM. Thus, GP processor 110 may be part of both the control plane and data plane for compute tile 100. GP processor 110 may be in the data plane of compute engine(s) 120 for some, but not all data movement operations.

GP processor 110 may also perform other functions. GP processor 110 may apply activation function(s) to data. For example, an activation function (e.g. a ReLu, Tanh, and/or SoftMax) may be applied to the output of compute engine(s) 120. Thus, GP processor 110 may perform nonlinear operations. GP processor 110 may also perform linear functions and/or other operations. However, GP processor 110 is still desired to have reduced functionality as compared to, for example, a graphics processing unit (GPU) or central processing unit (CPU) of a computer system with which tile 100 might be used.

Compute engines 120 are configured to perform, efficiently and in parallel, tasks that may be part of using (e.g. performing inferences) and/or training (e.g. performing inferences and/or updating weights) a model. Compute engines 120 are coupled with and receive commands and, in at least some embodiments, data from GP processor 110. Compute engines 120 are modules which perform vector-matrix multiplications (VMMs) in parallel. Thus, compute engines 120 may perform linear operations. Each compute engine 120 includes a compute-in-memory (CIM) hardware module (not specifically shown in FIG. 1). The CIM hardware module stores weights corresponding to a matrix and is configured to perform a VMM in parallel for the matrix. Compute engines 120 may also include local update (LU) module(s) (not specifically shown in FIG. 1). Such LU module(s) allow compute engines 120 to update weights stored in the CIM.

The CIM module is a hardware module that stores data and performs operations. In some embodiments, CIM module stores weights for the model. As such, the CIM module determines the maximum size of the model that can be handled by compute tile 100 (i.e. the maximum number of parameters, or weights). The CIM module stores the weights (or other data) in cells that are fully addressable. The CIM module also performs operations using the weights. More specifically, the CIM module performs VMMs, where the vector may be an input vector (e.g. an activation) provided using GP processor 110 and the matrix may be weights (i.e. data/parameters) stored by the CIM module. The CIM module may be considered to include a memory (e.g. that stores the weights) and compute hardware (e.g. that performs the vector-matrix multiplication of the stored weights). In some embodiments, the vector may be a matrix. The CIM module may include an analog SRAM having multiple SRAM cells and configured to provide output(s) (e.g. voltage(s)) corresponding to the data (weight/parameter) stored in each cell of the SRAM multiplied by a corresponding element of the input vector. In some embodiments, the CIM module may include a digital SRAM having multiple SRAM cells and configured to provide output(s) corresponding to the data (weight/parameter) stored in each cell of the digital SRAM multiplied by a corresponding element of the input vector. Other configurations of CIM modules are possible. Each CIM module thus stores weights corresponding to a matrix in its cells and is configured to perform a vector-matrix multiplication of the matrix with an input vector. In some embodiments, the CIM module of a compute engine 120 may be repurposed as memory if the compute engine utilization falls below a particular threshold (e.g. 70%-80%). For example, the CIM might store duplicate weights or vectors (e.g. activations) in such embodiments.

In order to facilitate on-chip learning, local update (LU) modules (not shown) may also be provided in compute engines 120. LU modules are coupled with the corresponding CIM modules. LU modules are used to update the weights (or other data) stored in the CIM modules. LU modules are considered local because LU modules are in proximity to CIM modules. For example, LU module(s) for a particular compute engine 120 may reside in the same integrated circuit as the CIM module(s) for compute engine 120. In some embodiments, the LU module is considered local because it is fabricated on the same substrate (e.g. the same silicon wafer) as the corresponding CIM module. In some embodiments, LU modules are also used in determining the weight updates. In other embodiments, a separate component may calculate the weight updates. For example, in addition to or in lieu of LU modules, the weight updates may be determined by GP processor 110, in software by other processor(s) not part of compute tile 100, by other hardware that is part of compute tile 100, by other hardware outside of compute tile 100, and/or some combination thereof.

Memory 130 may be or include a static random access memory (SRAM) and/or some other type of memory. Memory 130 is shown as coupled with GP processor 110. Stated differently, data movement between memory 130 and compute engines 120 may take place via GP processor 120. In some embodiments, memory 130 may be coupled to compute bus 140 (i.e. to compute engines 120). Memory 130 may store activations (e.g. input vectors provided to compute tile 100 and the resultant of activation functions applied to the output of compute engines 120). Memory 130 may also store weights. For example, memory 130 may contain a backup copy of the weights or different weights if the weights stored in compute engines 120 are desired to be changed. In some embodiments, memory 130 is organized into banks of cells (e.g. banks of SRAM cells). In such embodiments, specific banks of memory 130 may service specific one(s) of compute engines 120. In other embodiments, banks of memory 130 may service any compute engine 120.

DMA unit 170 initiates data movement for compute tile 100. DMA unit 170 may be used to move data from off-tile to on-tile and vice-versa. DMA unit 170 may also be used to move data between components of compute tile 100. For example, DMA unit 170 may be used to move data between memory 130 and compute engine(s) 120. DMA unit 170 may be used to communicate with a host (not shown) and/or other tiles (not shown in FIG. 1). For example, DMA 170 may be used to move input vectors (activations) from the host or another tile (not shown in FIG. 1) to memory 130 or compute engine(s) 120.

In operation, an input vector is provided to one or more of compute engines 120 using a data path that may bypass GP processor 110. For example, the input vector may be provided from memory 130 or from off-tile to compute engine(s) 120 without first being stored in GP processor 110. The input vector is desired to be multiplied by the weights, which may have been previously stored in compute engine(s) 120. The weights may have previously been loaded into compute engine(s) 120 using a data path that may bypass GP processor 110. An input vector may be provided to multiple compute engines 120 if the weight matrix and/or input vector have too many elements for a single compute engine. In some such embodiments, a portion of the input vector is provided to each of the multiple compute engines 120 (each of which stores a portion of the weights). GP processor 110 also instructs compute engine(s) 120 to perform a VMM. Compute engine(s) 120 perform a VMM between the input vector and the matrix of weights to provide an output. The VMM is performed in parallel for the elements of the input vector. The output of compute engine(s) 120 may be considered an output vector. The output may be provided by compute engine(s) 120 to GP processor 110. For example, the output may be stored in a vector register file of GP processor 110. The output might also be stored (e.g. in memory 130) and/or provided to another component off-tile. For example, the output of the VMM might be provided to another GP processor (not shown) on another tile (not shown) for a different activation to be provided. GP processor 110 may apply a function (e.g. an activation function) to the output. The results of the activation function applied to the output of compute engines 120 may be stored in GP processor 110 (e.g. in a buffer or the vector register file). GP processor 110 may also store the results in memory 130 or off-tile. GP processor 110 may provide the results as an input vector to other compute engine(s) 120 to apply a different set of weights to the results where another set of weights are stored in other compute engine(s) 120. Thus, one or more inferences with one or more distinct sets of weights may be performed. In some embodiments, training may also be performed by tile 100. In some such embodiments, GP processor 110 or another component (such as a host) may determine the desired update for the weights. In some embodiments, a local update (LU) module (not shown) of compute engines 120 may be used to determine and apply the updates to the weights.

Thus, compute tile 100 includes two compute blocks, GP processor 110 and compute engines 120, which work together. GP processor 110 may perform nonlinear operations (e.g. activation functions) and compute engines 120 may perform linear operations (e.g. VMMs). GP processor 110 is in the control and data planes for compute engines 120. GP processor 110 and compute engines 120 are, therefore, tightly coupled. Consequently, data may be moved more efficiently within tile 100. Operations, such as VMMs and the application of activation functions to the output of compute engines 120, may be more efficiently performed. Further, a special purpose controller need not be designed and fabricated for compute tile 100. Instead, GP processor 110 is used. As a result, compute tile 100 may be more flexible and more readily designed and fabricated. For example, the activation applied by GP processor 110 may be updated by updating GP processor 110. A new special purpose controller need not be provided. Consequently, functions for machine learning may be more efficiently and readily performed. In addition, compute tile 100 includes on-tile memory 130. Use of on-tile memory, for example as a scratchpad memory, allows for a high degree of independence of compute tile 100 from other components (e.g. other tiles). Thus, multiple tiles 100 may more readily work in parallel. Consequently, efficiency of learning may be enhanced.

Compute tile 100 may further facilitate the use of multiple tiles 100. Compute engines 120 may receive data from and/or provide data to not only compute engine 110, but also other components on compute tile 100 and components off of tile 100. For example, DMA unit 170 and GP processor 110 may access, via interconnect 140, not only memory 130 on-tile, but also memory in any other tile. More specifically, DMA unit 170 and/or GP processor 110 in a particular tile 110 can access the input buffer of compute engine 120, the output buffer of a compute engine, and the memory 130 of any tile. The data provided to and/or from compute engine(s) 120 and/or memory 130 need not pass through GP processor 110. This allows for a reduction in the number of hops it takes to move activation data from one tile to another. For example, the GP processor 110 can move data directly from its vector register (e.g. after applying an activation function) to the input buffer of a compute engine on another tile. Similarly, compute engine 120 may receive data directly from memory 130 or a GP processor on another tile. Similarly, DMA unit 170 may move data between memory 130 (on the same tile or of another tile) to compute engine(s) 120, memory 130, and/or a compute engine of another tile in a single transaction. Consequently, data transfer may be more efficient. The architecture of compute tile 100 may also reduce the complexity of the corresponding compiler because it can orchestrate data movement by either programming the DMA to access the remote address range or by using the load/store instructions of GP processor 110 to directly access the remote memory address space. Consequently, latency may be reduced, the ability of different compute tiles 100 to work together, and performance of the system may be improved.

Figure 2:
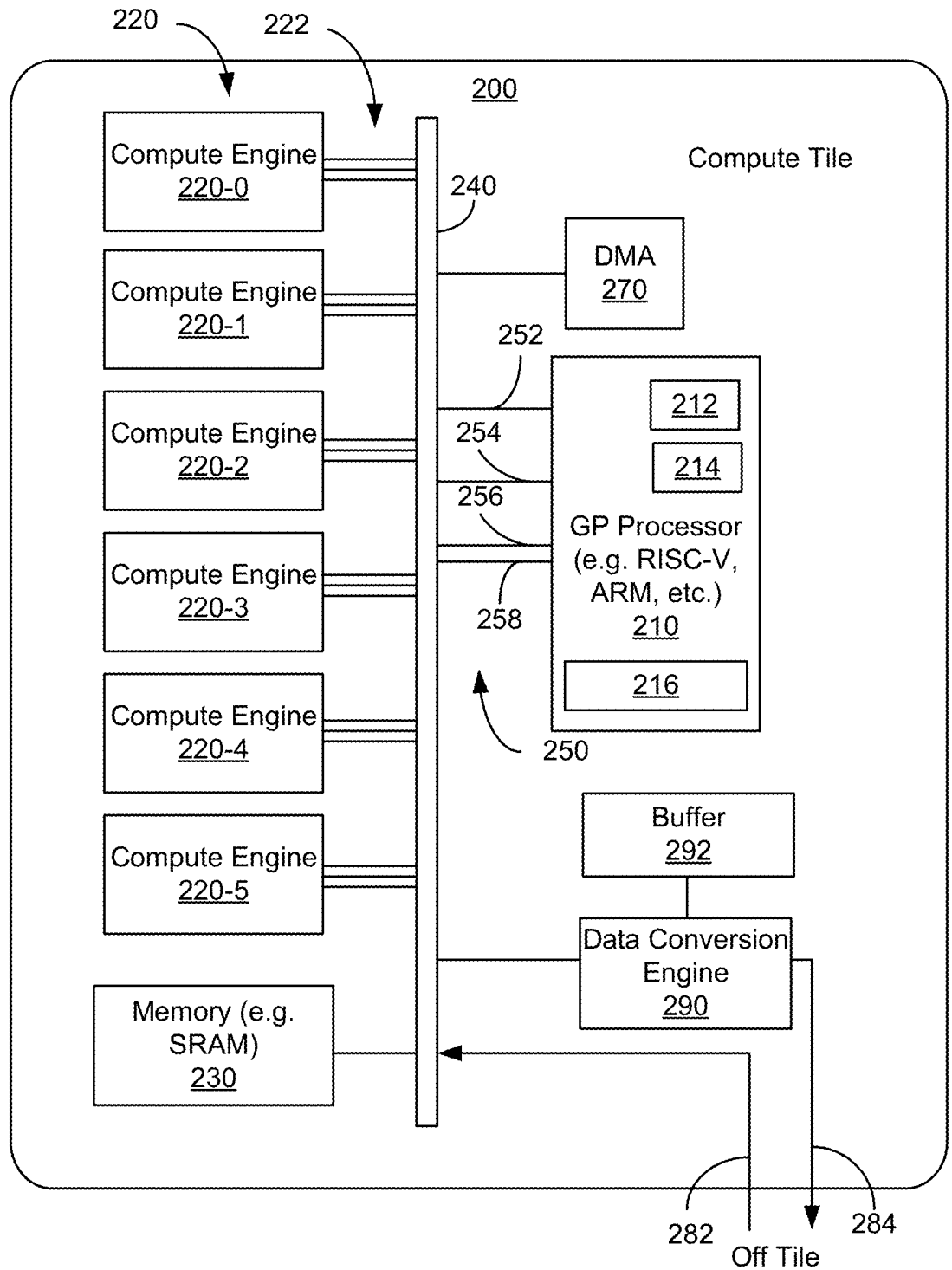
FIG. 2 depicts an embodiment of a system usable in an AI accelerator and having an efficient architecture.

FIG. 2 is a diagram depicting an embodiment of compute tile 200 usable in a learning network. Compute tile 200 that may be an AI accelerator having an efficient architecture. Compute tile 200 is analogous to compute tile 100. Compute tile 200 thus includes GP processor 210, compute engines 220-0 through 220-5 (collectively or generically compute engines 220), memory 230, interconnect 240, bus 250, DMA unit 270, mesh_in 282, and mesh_out 284 that are analogous to GP processor 110, compute engines 110-0 through 110-5, memory 130, interconnect 140, bus 150, DMA 170, mesh_in 182, and mesh_out 184, respectively. Although six compute engines 220 are shown, in other embodiments another number may be included. GP processor 210 is shown as being coupled with compute engines 220 via interconnect 240, and bus 250. In other embodiments, GP processor 210 may be connected with compute engines 220 in another manner. Data movement between memory 230 and compute engines 220 may take place via GP processor 220 or may exclude GP processor 230. Thus, data paths between compute engines 220 and other components both on and off tile 200 may bypass GP processor 220. Consequently, data movement for compute tile 200 may be analogous to compute tile(s) 100.

GP processor 210 is analogous to GP processor 110. Thus, GP processor 210 may be a RISC-V processor or ARM processor. In other embodiments, different and/or additional general purpose processor(s) may be used. The GP processor 210 provides control instructions and manages data flow for the compute engines 220. Data sent to or from compute engines 220 may (or may not) pass through GP processor 210. Thus, GP processor 210 may be part of both the control plane and data plane for compute tile 200. GP processor 210 may also perform other functions, including nonlinear functions. For example, GP processor 210 may apply activation function(s) to data. In some embodiments, GP processor 210 may include a vector processing unit (not shown) that executes nonlinear operations (e.g. applying activation functions to data). Also explicitly shown as part of GP processor 210 are local memories 212 and 214. In some embodiments, local memory 212 stores instructions while local memory 214 stores data.

GP processor 210 includes an additional fixed function compute block (FFCB) 216. In some embodiments, FFCB 216 is a single instruction multiple data arithmetic logic unit (SIMD ALU). In some embodiments, FFCB 216 may be configured in another manner. For example, FFCB 216 may be a lookup table used in applying activation functions to the output of a VMM. FFCB 216 may be a close-coupled fixed-function unit for on-device inference and training of learning networks. In some embodiments, FFCB 216 executes nonlinear operations, number format conversion and/or dynamic scaling. In some embodiments, other and/or additional operations may be performed by FFCB 216. FFCB 216 may be coupled with the data path for the vector processing unit of GP processor 210.

Compute engines 220 are analogous to compute engines 120. Compute engines 220 are configured to perform, efficiently and in parallel, tasks that may be part of using and/or training a model. Compute engines 220 are coupled with and receive commands and, in at least some embodiments, data from GP processor 210. Compute engines 220 perform linear operations such as VMMs in parallel. Each compute engine 220 includes a CIM hardware module (not specifically shown in FIG. 2) analogous to that described for compute engines 120. The CIM hardware module stores weights corresponding to a matrix and is configured to perform a VMM for the matrix. Compute engines 220 may also include LU module(s) (not specifically shown in FIG. 2).

Bus 250 couples GP processor 210 with interconnect 240 and, therefore, with compute engines 220, memory 230, DMA unit 270, mesh_in 282 and mesh_out 284. Compute bus 250 includes control bus 252, streaming bus 254, status bus 256, and interconnect bus 258. Control bus 252, streaming bus 254, status bus 256, and interconnect bus 258 may be used to access a control port (not explicitly labeled), a streaming port (not explicitly labeled), a status port (not explicitly labeled), and an interconnect port (not explicitly labeled), respectively, of GP processor 210. Control bus 252 receives instructions for compute engines 220 from GP processor 210. Compute engines 220 perform operations based on the instructions. For example, the instructions may include a load instruction to load data from GP processor 210 to identified compute engine(s) 220, a store instruction to store data from identified compute engine(s) 220 to GP processor 210 or memory 230, and supporting instructions that identify the addresses in identified compute engine(s) 220 to which data is to be loaded and from which data is to be read. Streaming bus 254 may be a high speed, high bandwidth bus. In some embodiments, streaming bus 254 is 512 bits wide. Other bus widths are possible. Streaming bus 254 is used to rapidly move data between GP processor 210 and compute engines 220. Status bus may allow for reading from or writing to a status register for a compute engine 220. Thus, GP processor 210 may be informed of the particular compute engine 220 completing a task, such as a VMM. Interconnect bus 258 may be an AXI interconnect bus for use with interconnect 240.

Compute tile 200 also includes a data conversion engine 290 and, in some embodiments, associated buffer 292. Data conversion engine 290 may be used to convert between formats of data stored in different components on compute tile 200 or off of compute tile 200. For example, data conversion engine 290 may be or include a reshape engine. Conventional convolution-heavy deep learning accelerators may suffer from spending valuable compute cycles on activation re-shape and augmentation (e.g. padding), in preparation for the following layer. This is particularly common for edge-AI accelerators in which convolutions are broken into vector matrix products using processes such as im2col. Zero-padding may also be used for the convolution requirements. In spatial architectures utilizing a weight stationary in-memory computing array, padding may be used for matrices of a fixed size to access smaller submatrices within the in-memory computing array. Data conversion engine 290 may be used to manage the data flow for transactions between tiles. Although shown as on mesh_out 284 connection, in some embodiments the data conversion engine 290 may be on mesh_in 282, or on both mesh_in 282 and mesh_out connections 284. Data conversion engine 290 may be used to perform functions such as padding, im2col, gather, transpose, and/or other operations. Thus, the flow of data between tiles may be better managed. This may reduce latency by performing padding and data re-shaping via the DMA while the data is in-flight, moving from one tile to another. For example, as the data is moved via the interconnect, the data may be augmented on the fly using some combination of registers and logic. For example, a custom DMA by DMA unit 270 may be used to orchestrate the data movement of activations from memory 230 into the compute engines 220 of other tiles. This DMA also controls the type of data-augmentation and padding done while the data is in movement. Data conversion engine 290 may also include a gather engine. The gather engine may be instructed how to form the im2col data on the fly. Such an operation may reduce the bulk storage and also memory 130 energy excess by generating the im2col data before data is copied into the activations. Data conversion engine 290 may thus act as a DMA engine that can perform padding, transpose, im2col operations, gather operations, reshape (which may be separate from a gather) and/or other operations. In some embodiments, data conversion engine 290 may also be coupled with interconnect 240 such that other conversions between data formats may be performed. For example, data conversion engine might perform conversions between the data format stored in memory 230 and the data format used by compute engines 220 (e.g. between BFloat and integer) if different formats are used.

Compute tile 200 functions in an analogous manner to compute tile 100. For example, data may be transferred on-tile from a host or other tile via DMA unit 270 and/or mesh_in 282. Such data may be stored in memory 230 or provided to compute engine(s) 280 without first being stored in GP processor 210. Thus, memory 230 may store weights and input vectors. The weights may be loaded in one or more compute engines 220 for use. For example, the weights may be moved from memory 230 or off tile to the CIM hardware module(s) of compute engine(s) 220. For an inference, an input vector is provided to one or more of compute engines 220. To do so, the input vector/activation may be moved from memory 230, GP processor 210 (e.g. after an activation function has been applied), or off tile to compute engine(s) 220 via interconnect 240. Compute engine(s) 220 perform a VMM in parallel of the elements of the input vector and the matrix (or matrices) of weights stored in compute engine(s)

220. The output of compute engine(s) 220 may be stored from compute engine(s) 220 to GP processor 210 via streaming bus 254 or may be moved elsewhere. For example, the output of the VMM by compute engine(s) 220 may be stored in memory 230 or provided to another tile (e.g. to another GP processor). GP processor 210 may apply a function (e.g. an activation function) to the output. The resultant of the activation function applied to the output of compute engines 220 may be stored in GP processor 210 (e.g. a vector register or a buffer, which is not explicitly shown in FIG. 2). GP processor 210 may also store the resultant in memory 230. GP processor 210 may provide the resultant to another tile or the host via mesh_out 284 or DMA unit 270. GP processor 210 may provide the resultant as an input vector to other compute engine(s) 220 to apply a different set of weights to the resultant where another set of weights are stored in other compute engine(s). Thus, one or more inferences with one or more distinct sets of weights may be performed. In some embodiments, training may also be performed by tile 200. In some such embodiments, GP processor 210 or another component (such as a host) may determine the desired update for the weights. In some embodiments, LU module (not shown) of compute engines 220 may be used to determine and apply the updates to the weights.

Compute tile 200 may share the benefits of compute tile 100. GP processor 210 and compute engines 220 are compute blocks which work closely together. For example, the data and control planes for compute tile 200 may include memory 230, GP processor 210, buses 240 and 250, DMA unit 270, and compute engines 220. Consequently, data may be moved more efficiently within tile 200 and operations, such as VMMs and the application of activation functions, may be more efficiently performed. Further, a special purpose controller need not be designed and fabricated for compute tile 200. As a result, compute tile 200 may be more flexible and more readily designed and fabricated. Consequently, functions for machine learning may be more efficiently and readily performed. In addition, on-tile memory 230 allows for a high degree of independence of compute tile 200 from other components (e.g. other tiles). Thus, multiple tiles 200 may more readily work in parallel and efficiency may be improved. Further data may be moved within compute tile 200 and between compute tile 200 and other compute tiles more efficiently and with lower latency. Consequently, the ability of compute tiles 200 to work together may be further enhanced.

Figure 3:
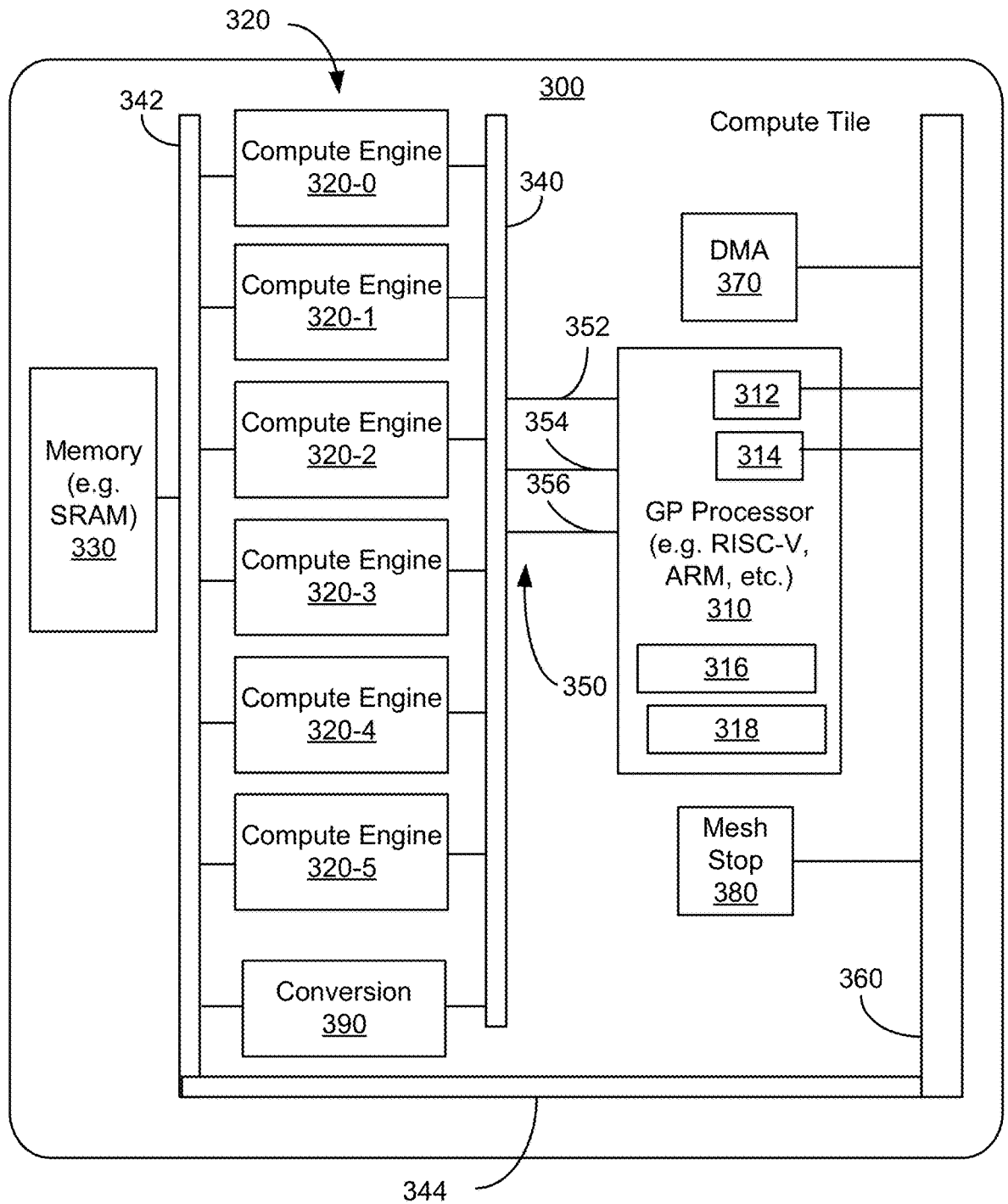
FIG. 3 depicts an embodiment of a system usable in an AI accelerator and having an efficient architecture.

FIG. 3 is a diagram depicting an embodiment of compute tile 300 usable in a learning network. Compute tile 300 that may be an AI accelerator having an efficient architecture. Compute tile 300 is analogous to compute tiles 100 and 200. Compute tile 300 thus includes GP processor 310, compute engines 320-0 through 320-5 (collectively or generically compute engines 320), memory 330, compute bus 340, bus 350, DMA unit 370, mesh stop 380, and data conversion engine 390 that are analogous to GP processors 110/210, compute engines 120/220, memory 130/230, interconnect 140/240, bus 150/250, DMA unit 170/270, mesh stop 180/280, and data conversion engine 290, respectively. Although six compute engines 320 are shown, in other embodiments another number may be included. GP processor 310 is shown as being coupled with compute engines 320 via compute bus (or other connector) 340 and bus 350. In other embodiments, GP processor 310 may be connected with compute engines 320 in another manner. GP processor 310 also includes memories 312 and 314 and FFCB 316 analogous to local memories 212 and 214 and FFCB 216, respectively. Bus 350 includes control bus 352, streaming bus 354, and status bus 356 analogous to control bus 252, streaming bus 254, and status bus 256, respectively.

GP processor 310 is analogous to GP processors 110 and/or 210. Thus, GP processor 310 may be a RISC-V processor or ARM processor. In other embodiments, different and/or additional general purpose processor(s) may be used. The GP processor 310 provides control instructions and manages dataflow for the compute engines 320. Data sent to or from compute engines 320 may also pass through GP processor 310. Thus, GP processor 310 may be part of both the control plane and data plane for compute tile 300. GP processor 310 may also perform other functions, including nonlinear functions. For example, GP processor 310 may apply activation function(s) to data. In some embodiments, GP processor 310 may include a vector processing unit (not shown) that executes nonlinear operations (e.g. applying activation functions to data). However, in some instances, the data path to or from compute engines 320 may bypass GP processor 310. For example, input vectors may be provided from memory 330 to compute engine(s) 320 without being stored in GP processor 310. Similarly, input vectors and/or other data may be provided from off of compute tile 300 to compute engine(s) 320 without being stored in GP processor 310. Consequently, data movement for compute tile 300 may be analogous to compute tile(s) 100 and/or 200.

Compute engines 320 are analogous to compute engines 120 and/or 220. Compute engines 320 are configured to perform, efficiently and in parallel, tasks that may be part of using and/or training a model. Compute engines 320 perform linear operations such as VMMs in parallel. Each compute engine 320 includes a CIM hardware module (not specifically shown in FIG. 3) analogous to that described for compute engines 120. The CIM hardware module stores weights corresponding to a matrix and is configured to perform a VMM for the matrix. Compute engines 320 may also include LU module(s) (not specifically shown in FIG. 3). In addition, on-tile memory 330 allows for a high degree of independence of compute tile 300 from other components (e.g. other tiles). Thus, multiple tiles 300 may more readily work in parallel. Compute engines 320 are coupled with and receive commands and, in at least some embodiments, data from GP processor 310. More specifically, compute bus 340 provides a connection between compute engines 320 and GP processor 310 for commands and data. Compute engines 320 may also send and/or receive data from other sources in data paths that bypass GP processor 310.

Compute tile 300 also includes interconnects 342, 344, and 360. Interconnect 342 may be a data bus 342. Interconnect 344 may be an AXI interconnect. Bus 360 may be a system bus for compute tile 300. Compute engines 320 have direct connections with memory 330 via data bus 342 for data movement between compute engines 320 and memory 330. Compute engines 320 also have a dedicated bus (i.e. compute bus 340) for data movement between and commands from GP processor 310. Interconnect 344 allows targeting of memory 330 and/or compute engines 320 from other agents, such as GP processor 310, DMA unit 370, and/or off-tile components via mesh stop 380.

Using interconnects 340, 342, 344 and 360, compute engines 320, as well as other components such as memory 330, may send and/or receive data in data paths that bypass GP processor 310. For example, DMA unit 370 may transfer data (e.g. weights and/or input vectors) from memory 330 to compute engine(s) 320 via data bus 342. Data may be transferred to memory 330 from compute engine(s) 320 via data bus 342. Similarly, data may be transferred from off-tile to compute engine(s) 320 via mesh stop 380, bus 360, interconnect 344, and bus(es) 340 and/or 342. Data may be transferred from compute engine(s) 320 off-tile via bus(es) 340 and/or 342, interconnect 344, bus 360, and mesh stop 380. For these data movement transactions, the data need not be stored in GP processor 310. Thus, the data movement follows data paths that may bypass, or exclude, GP processor 310. Consequently, data may be moved more efficiently between components of tile 300 as well as to and/or from other tile(s).

Data conversion engine 390 may be used for data transfers to and/or from compute engines 320. More specifically, data conversion engine 390 may be used to provide data to compute engines 320 in the format used by compute engines 320. Data conversion unit 390 may also be used to provide data from compute engines 320 to other components in the format used by these other components. For example, data conversion engine 390 may be a BFloat/Integer conversion unit 390. In some such embodiments, data (e.g. weights and/or input vectors) may be stored in memory 330 in integer (e.g. INT8) format. However, compute engines 320 may perform operations on data in BFloat (e.g. BF16) format. In such embodiments data retrieved from memory 330 is provided via data bus 342 to data conversion engine 390 for conversion to BFloat format. The converted, BFloat format data is provided to compute engine(s) 320 via data bus 342 or compute bus 340. Similarly, data transferred from compute engines 320 to memory 330 or an analogous component off-tile may be converted from BFloat format to integer format by data conversion engine 390. In some embodiments, data conversion engine 390 may not be present. For example, if memory 330 and compute engines 320 use the same data format, data conversion engine 390 might be omitted.

Compute engine(s) 320 may transfer data to/from GP processor 310 via compute bus 340 and bus 350. For example, using compute bus 340 and bus 350, the output of the VMM for compute engine(s) 320 may be provided to GP processor 310 for application of an activation function. In the embodiment shown, GP processor 310 includes data conversion engine 318 that is analogous to data conversion engine 390. For example, the output of the VMM for compute engine(s) 320 may be loaded to GP processor 310 for application of a nonlinear function (e.g. an activation function). After the activation function has been applied to the output of the VMM, data conversion engine 318 may be used to convert the resultant into integer format for storage in memory 330 or for movement off-tile. GP processor 310 may move data via system bus 360 off tile or to/from memory 330 (via interconnect 344 and data bus 342).

Compute tile 300 functions in an analogous manner to compute tile(s) 100 and/or 200. For example, data may be transferred on-tile from a host or other tile. Such data may be stored in memory 330 or provided to compute engine(s) 380 without first being stored in GP processor 310. Data stored in memory 330 (e.g. weights and/or input vectors) may be transferred to and/or from compute engines 320 directly via data bus 342 (as well as data conversion engine 390, where appropriate). Compute engine(s) 320 perform a VMM in parallel of the elements of the input vector and the matrix (or matrices) of weights stored in compute engine(s) 320. The output of compute engine(s) 320 may be transferred from compute engine(s) 320 to GP processor 310 via compute bus 340 and bus 350. The output of compute engine(s) 320 may also be provided to another component. For example, the output of the VMM by compute engine(s) 320 may be stored in memory 330 via data bus 342 (and data conversion engine 390 where appropriate) or provided to another tile (e.g. to another GP processor) via system bus 360. GP processor 310 may apply a function (e.g. an activation function) to the output. The resultant of the activation function applied to the output of compute engines 320 may be stored in GP processor 310 (e.g. a vector register or a buffer, which is not explicitly shown in FIG. 3), in memory 330, provided the resultant to another tile via system bus 360, or provided to other compute engine(s) 320 via compute bus 340 and bus 350. In some embodiments, training may also be performed by tile 300.

Compute tile 300 may share the benefits of compute tile(s) 100, 200, and/or 300. For example, GP processor 310 and compute engines 320 are compute blocks which work closely together. Further, data may be provided to components such as compute engines 320 without first being stored in GP processor 310. Consequently, data may be moved more efficiently within tile 300 and between compute tile 300 and other compute tiles (not shown). Thus, multiple tiles 300 may more readily work in parallel and efficiency may be improved. Use of interconnects 340, 342, 344, and 360 may further reduce latency. Use of data conversion engines 390 and/or 318 allows for performing computations in BFloat format and storage in integer format. This may result in a significant memory saving. Use of multiple interconnects 340, 342, 344, and 360 may increase the area consumed by and complexity of compute tile 300.

Figure 4:
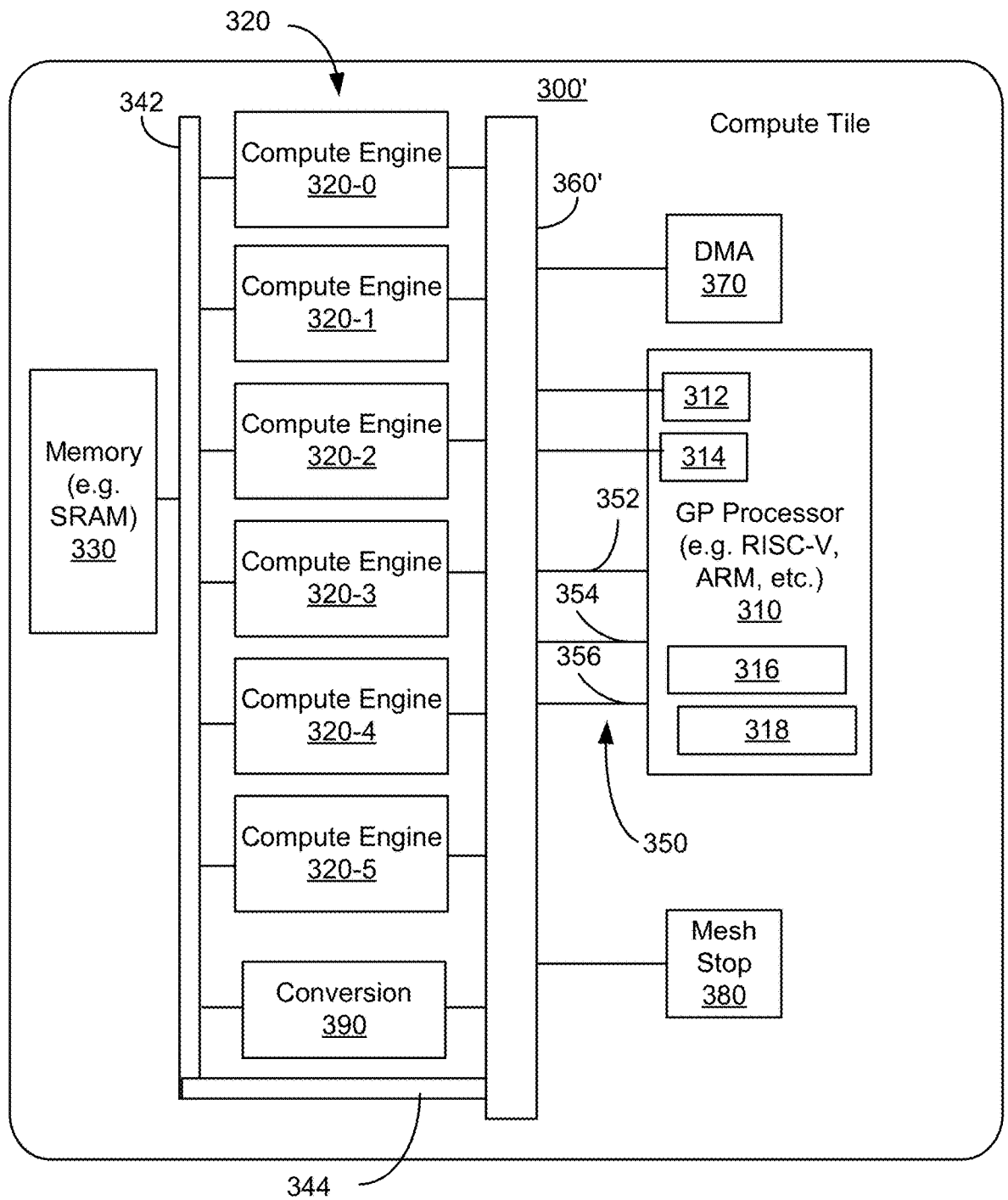
FIG. 4 is a diagram depicting an embodiment of a system usable in an AI accelerator and having an efficient architecture.

FIG. 4 is a diagram depicting an embodiment of compute tile 300' usable in a learning network. Compute tile 300' that may be an AI accelerator having an efficient architecture. Compute tile 300' is analogous to compute tile(s) 100, 200, and/or 300. Compute tile 300' may be considered most analogous to compute tile 300. Compute tile 300' thus includes GP processor 310, compute engines 320-0 through 320-5 (collectively or generically compute engines 320), memory 330, data bus 342, bus 350, system bus 360', DMA unit 370, mesh stop 380, and data conversion engine 390 that are analogous to GP processors 110/210/310, compute engines 120/220/320, memory 130/230/330, data bus 342, bus 150/250/350, system bus 360, DMA unit 170/270, mesh stop 180/280/380, and data conversion engine 290/390, respectively. Although six compute engines 320 are shown, in other embodiments another number may be included.

Compute tile 300' (e.g. GP processor 310, compute engines 320, memory 330, data conversion units 390 and 318, DMA 370, and mesh stop 380) functions in an analogous manner to compute tile 300 and compute tile(s) 100 and/or 200. However, compute bus 340 of compute tile 300 has been removed in compute tile 300'. Data is transferred between compute engine(s) 320 and GP processor 310 via system bus 360' and bus 350. Thus, the transfer of data between GP processor 310 and compute engines 320 does not take place through a dedicated compute bus. Similarly, data may be moved between compute engine(s) 320 and another tile (not shown) via system bus 360' and mesh stop 380. Data may still be transferred to and/or from compute engines 320, as well as other components such as memory 330, using data paths that bypass GP processor 310. For example, DMA unit 370 may transfer data (e.g. weights and/or input vectors) from memory 330 to compute engine(s) 320 via data bus 342. Data may be transferred to memory 330 from compute engine(s) 320 via data bus 342. Similarly, data may be transferred from off-tile to compute engine(s) 320 via mesh stop 380, and bus 360'. Data may be transferred from compute engine(s) 320 off-tile via bus 360' and mesh stop 380. For these data movement transactions in which GP processor 310 is not the source or destination, the data need not be stored in GP processor 310. Thus, the data movement follows data paths that may bypass, or exclude, GP processor 310. Consequently, data may be moved more efficiently between components of tile 300' as well as to and/or from other tile(s).

Compute tile 300' may share the benefits of compute tile(s) 300, 100, and/or 200. For example, GP processor 310 and compute engines 320 are compute blocks which work closely together. Further, data may be provided to components such as compute engines 320 without first being stored in GP processor 310. Consequently, data may be moved more efficiently within tile 300 and between compute tile 300 and other compute tiles (not shown). Thus, multiple tiles 300 may more readily work in parallel and efficiency may be improved. Use of interconnects 342, 344, and 360 may further reduce latency. Use of data conversion engines 390 and/or 318 allows for performing computations in BFloat format and storage in integer format. This may result in a significant memory saving. Use of system bus 360' in place of interconnect 340 may reduce the area consumed by and complexity of compute tile 300' from that of compute tile 300. However, latency of data movement transactions from compute engines 320 via system bus 360' may be slightly increased.

Figure 5:
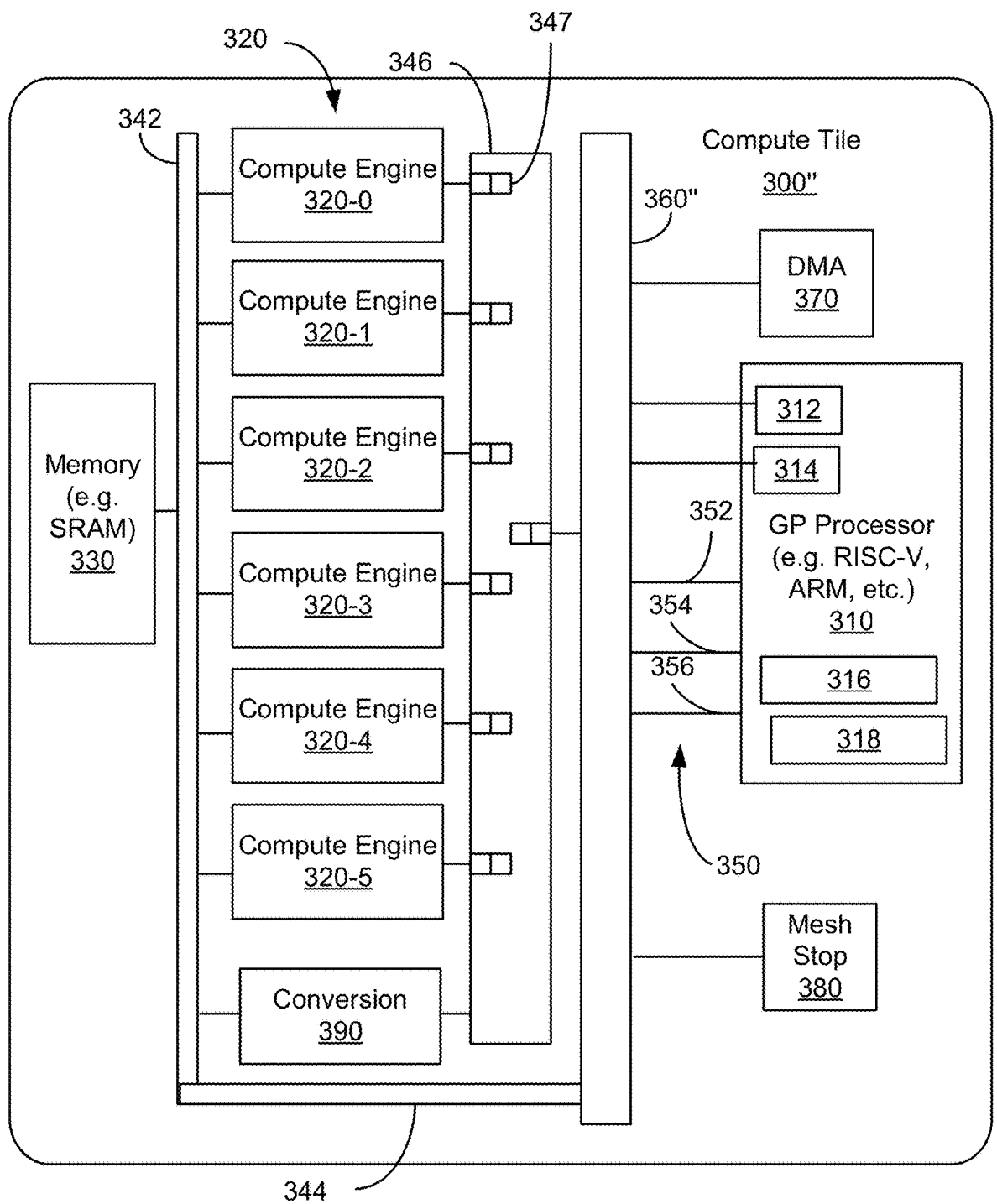
FIG. 5 depicts an embodiment of a system usable in an AI accelerator and having an efficient architecture.

FIG. 5 is a diagram depicting an embodiment of compute tile 300" usable in a learning network. Compute tile 300" that may be an AI accelerator having an efficient architecture. Compute tile 300" is analogous to compute tile(s) 100, 200, 300, and/or 300'. Compute tile 300" may be considered most analogous to compute tiles 300 and 300'. Compute tile 300" thus includes GP processor 310, compute engines 320-0 through 320-5 (collectively or generically compute engines 320), memory 330, data bus 342, bus 350, system bus 360", DMA unit 370, mesh stop 380, and data conversion engine 390 that are analogous to GP processors 110/ 210/310, compute engines 120/220/320, memory 130/230/ 330, data bus 342, bus 150/250/350, system bus 360/360', DMA unit 270, mesh stop 180/280/380, and data conversion engine 290/390, respectively. Although six compute engines 320 are shown, in other embodiments another number may be included.

Compute tile 300" also includes interconnect 346 coupling compute engines 320 with system bus 360". In some embodiments, interconnect 346 is an AXI interconnect. Interconnect 346 includes a queuing mechanisms indicated by slots 347 (of which only one is labeled) in queues for each compute engine 320. As a result, latency of data movement between compute engines 320 and system bus 360" may be improved. For example, latency and/or throughput may be managed via a queue study in case of a bottleneck in interconnect 346.

Compute tile 300" (e.g. GP processor 310, compute engines 320, memory 330, data conversion units 390 and 318, DMA 370, and mesh stop 380) functions in an analogous manner to compute tiles 300 and 300' and compute tile(s) 100 and/or 200. Data is transferred between compute engine(s) 320 and GP processor 310 via interconnect 346, system bus 360", and bus 350. Thus, the transfer of data between GP processor 310 and compute engines 320 does not take place through a dedicated compute bus. Similarly, data may be moved between compute engine(s) 320 and another tile (not shown) via system bus 360' and mesh stop 380. Although compute bus 340 of compute tile 300 has been removed in a manner analogous to compute tile 300', traffic over system bus 360" may be better managed than in compute tile 300'. In particular, interconnect 346 may allow for tuning of latency of data transfers between compute engines 320 and system bus 360".

Data may still be transferred to and/or from compute engines 320, as well as other components such as memory 330, using data paths that bypass GP processor 310. For example, DMA unit 370 may transfer data (e.g. weights and/or input vectors) from memory 330 to compute engine(s) 320 via data bus 342. Data may be transferred to memory 330 from compute engine(s) 320 via data bus 342. Similarly, data may be transferred from off-tile to compute engine(s) 320 via mesh stop 380, bus 360", and interconnect 346. Data may be transferred from compute engine(s) 320 off-tile via interconnect 346, bus 360" and mesh stop 380. For these data movement transactions in which GP processor 310 is not the source or destination, the data need not be stored in GP processor 310. Thus, the data movement follows data paths that may bypass, or exclude, GP processor 310. Consequently, data may be moved more efficiently between components of tile 300" as well as to and/or from other tile(s).

Compute tile 300" may share the benefits of compute tile(s) 300, 300', 100, and/or 200. For example, GP processor 310 and compute engines 320 are compute blocks which work closely together. Further, data may be provided to components such as compute engines 320 without first being stored in GP processor 310. Consequently, data may be moved more efficiently within tile 300" and between compute tile 300" and other compute tiles (not shown). Thus, multiple tiles may more readily work in parallel and efficiency may be improved. Use of interconnects 342, 344, and 360 may further reduce latency. Use of data conversion engines 390 and/or 318 allows for performing computations in BFloat format and storage in integer format. This may result in a significant memory saving. Use of system bus 360" in combination with interconnect 346 may reduce the area consumed by and complexity of compute tile 300' from that of compute tile 300 while mitigating latencies that may arise.

Figure 6A:
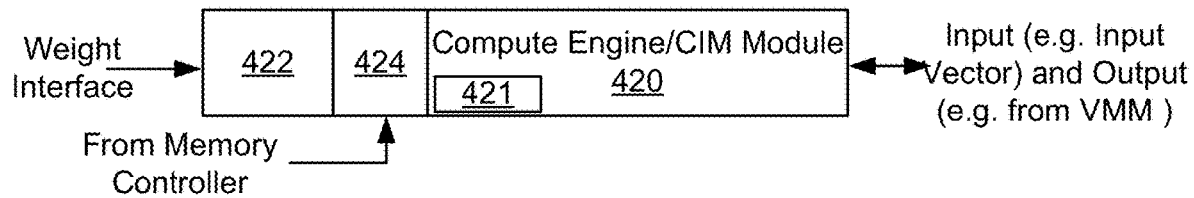
FIGS. 6A-6B depict embodiments of a system usable with a compute engine in an AI accelerator and having an efficient architecture.
Figure 6B:
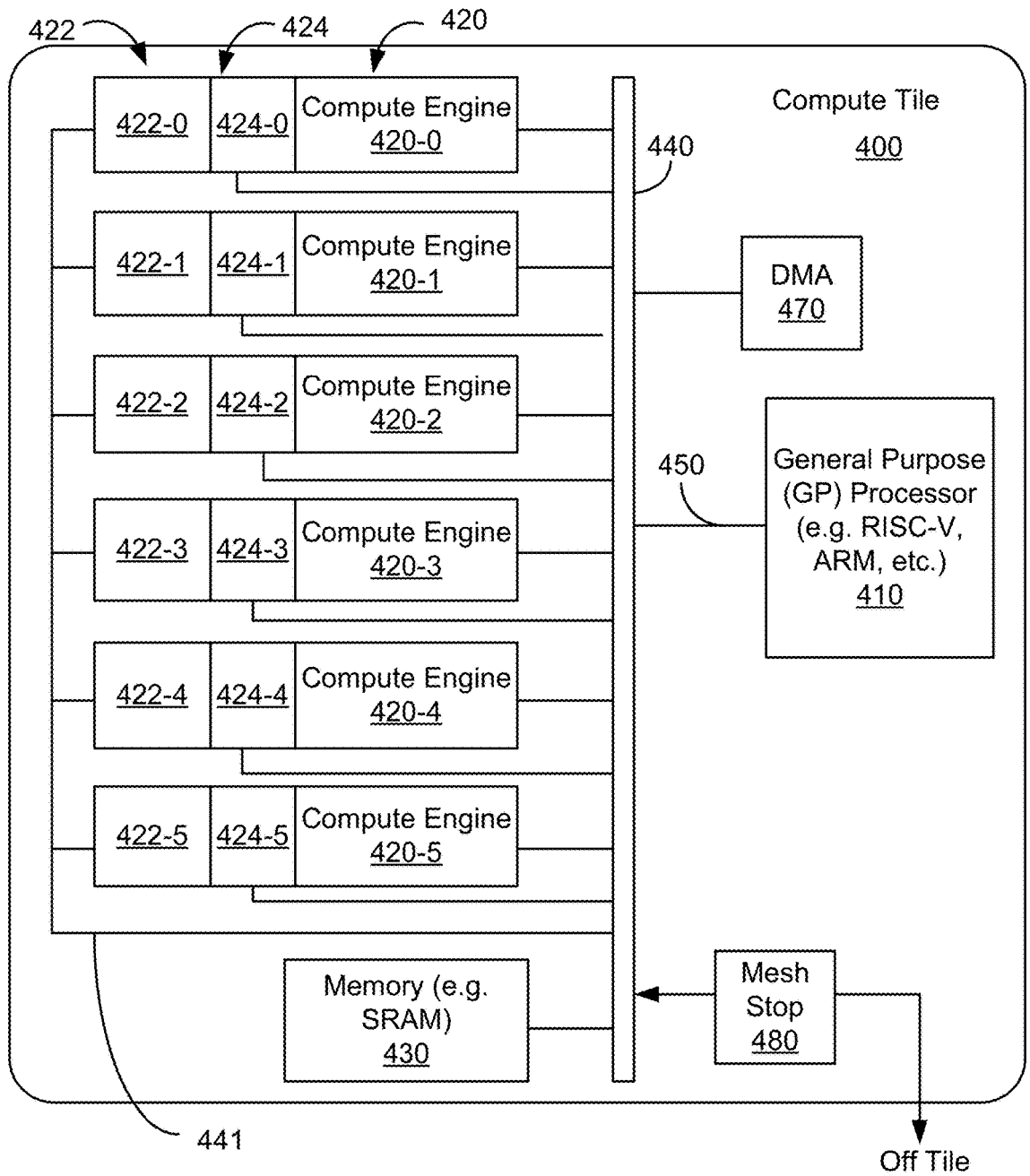

FIGS. 6A and 6B of compute tile 400 and the environment of compute engine 420 usable in an AI accelerator. FIG. 6A depicts compute engine 420, local compute engine memory 422, and cache controller 424. FIG. 6B depicts compute tile 400 in which compute engine 420, local compute engine memory 422, and cache controller 424 may be used. In some embodiments, compute engine 420, local compute engine memory 422, and cache controller 424 may be utilized in a different compute tile having other components. Compute engine 420 may be analogous to compute engine(s) 120, 220, and/or 320. Compute engine 420, local compute engine memory 422, and cache controller 424 may facilitate swapping of weights. In some embodiments, compute engine 420 in conjunction with local compute engine memory 422 and cache controller 424 may have particular utility for a model that does not use a weight stationary architecture. However, nothing prevents the use of compute engine 420, local compute engine memory 422, and cache controller 424 in a weight stationary architecture (i.e. with a model for which weights stored in compute engine 420 are not routinely changed). In some embodiments, compute engine 420, local compute engine memory 422 and cache controller may be considered weight stationary for the weights stored in the combination of compute engine 420 and local compute engine memory 422. This is because such weights may be moved between local compute engine memory 422 and compute engine 422. However, such weights may not be moved to other components (e.g. memory 430). Further, compute engine 420 in combination with cache controller 424 and local compute engine memory 422 may allow for an improved balance between compute and memory in compute tile 400.

Local compute engine memory 422 includes memory cells (not explicitly shown). In some embodiments, local compute engine memory 422 is an SRAM memory. Thus, local compute engine memory 422 has a corresponding memory density. Compute engine 420 includes a CIM hardware module and may include a local cache 421. Such a CIM hardware module both stores data and performs a VMM in parallel. Thus, the CIM hardware module includes larger cells that include both storage (e.g. SRAM memory cells) and compute logic. As a result, the memory density of CIM hardware module is lower than the memory density of local compute engine memory 422. For example, in some embodiments, the density of local compute engine memory 422 is at least two and not more than eight multiplied by the memory density of the CIM hardware module of compute engine 420. In some such embodiments, the density of local compute engine memory 422 is at least four multiplied by the memory density of the CIM hardware module of compute engine 420.

Cache controller 424 copies data from the local compute engine memory 422 and writes the data to the appropriate location in the CIM hardware module of compute engine 420. Thus, higher memory density memory 422 may provide regular storage of the weights used by compute engine 420. As the weights are needed by the CIM hardware module of compute engine 420, cache controller 424 can manage loading of weights from local compute engine memory 422. Cache controller 424 may be controlled by GP processor 410 and/or another memory controller. In some embodiments, the storage in CIM hardware module of compute engine 420 may act as a local cache. In some embodiments, an additional local cache 421 may be provided. The storage of the CIM hardware module may be sized such that high reuse may be achieved. Consequently, the overall engine (compute engine 420 in combination with local compute engine memory 422 and cache controller 424) may achieve a more balanced storage and compute element array. Further, if utilization of compute engine 420 is below a threshold, compute engine 420 may be used as additional memory. For example, the threshold may be at least 70 percent usage and not more than eight percent usage in some embodiments.

Referring to FIG. 6B, compute tile 400 is analogous to compute tile(s) 100, 200, 300, 300', and/or 300". Compute tile 400 may be most analogous to compute tile 100. Thus, interconnects corresponding to interconnects 342, 344, 346, and bus 360, 360', and/or 360" are not shown. In some embodiments, such interconnects may be present and compute tile 400 may be differently configured. Compute tile 400 includes GP processor 410, compute engines 420-0 through 420-5 (collectively or generically compute engines 420), memory 430, interconnect 440, bus 450, DMA unit 470, and mesh stop 480 that are analogous to GP processors 110/210/310, compute engines 120/220/320, memory 130/230/330, interconnect 140240/340, bus 150/250/350, DMA unit 170/270/370, and mesh stop 180/280/380. Although six compute engines 320 are shown, in other embodiments another number may be included. Compute tile 400 also includes local compute engine memory 422-0 through 422-5 (collectively or generically 422) analogous to local compute engine memory 422 of FIG. 6A and cache controllers 424-0 through 424-5 (collectively or generically 424) analogous to cache controller 424 of FIG. 6A. Although not shown, each compute engine 420 might also include a separate cache.

Compute tile 400 (e.g. GP processor 410, compute engines 420, memory 430, DMA 470, and mesh stop 480) functions in an analogous manner to compute tile(s) 100, 200, 300, 300' and/or 300". For these data movement transactions in which GP processor 410 is not the source or destination, the data need not be stored in GP processor 410. Thus, the data movement follows data paths that may bypass, or exclude, GP processor 410. Consequently, data may be moved more efficiently between components of tile 400 as well as to and/or from other tile(s). Compute tile 400 also includes interconnect 441 coupled with local compute engine memory 422. Weights from off-tile or from memory 430 may be more readily stored in local compute engine memory 422. Weights and/or other data may be moved between local compute engine memory 422 and the CIM hardware module of compute engines 420 as described herein. Thus, the combination of compute engines 420, local compute memory 422, and cache controller 424 may not only provide an improved balance between storage and computation of VMMs, but also provide additional storage when the usage of compute engine 420 is at or below a threshold.

Compute tile 400 may share the benefits of compute tile(s) 100, 200, 300, 300', and/or 300". For example, GP processor 410 and compute engines 420 are compute blocks which work closely together. Further, data may be provided to components such as compute engines 420 without first being stored in GP processor 410. Consequently, data may be moved more efficiently within tile 400 and between compute tile 400 and other compute tiles (not shown). Thus, multiple tiles 400 may more readily work in parallel and efficiency may be improved. Compute engines 420 in combination with local compute memory 422 and cache controllers 424 may allow for operations such as inferences, training, and/or other applications may be more efficiently performed. Further, because local compute memory 422 may store weights at a higher density, computations by compute engines 420 may be accomplished at low power because shuttling of data from memory 430 to compute may be reduced or minimized. Thus, performance may be improved.

Figure 7:
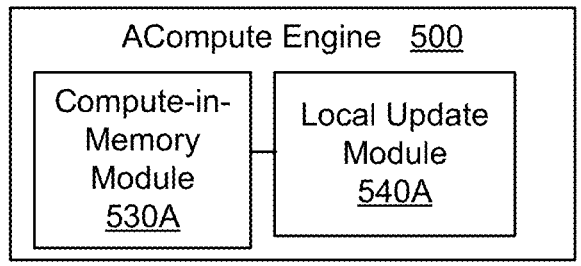
FIG. 7 depicts an embodiment of a compute engine usable in an AI accelerator.

FIG. 7 depicts compute engine 500A usable in an AI accelerator. Compute engine 500A may be part of an AI accelerator that can be deployed for using a model (not explicitly depicted) and for allowing for on-chip training of the model (otherwise known as on-chip learning). Compute engine 500A may thus be used as compute engine(s) 120, 220, and/or 320. Compute engine 500A includes CIM module 530A and LU module 540A. Although one CIM module 530A and one LU module 540A is shown, a compute engine may include another number of CIM modules 530A and/or another number of LU modules 540A. For example, a compute engine might include three CIM modules 530A and one LU module 540A, one CIM module 530A and two LU modules 540A, or two CIM modules 530A and two LU modules 540A.

CIM module 530A is a hardware module that stores data and performs operations. In some embodiments, CIM module 530A stores weights for the model. CIM module 530A also performs operations using the weights. More specifically, CIM module 530A performs vector-matrix multiplications, where the vector may be an input vector provided using processor 110 and the matrix may be weights (i.e. data/parameters) stored by CIM module 530A. Thus, CIM module 530A may be considered to include a memory (e.g. that stores the weights) and compute hardware (e.g. that performs the vector-matrix multiplication of the stored weights). In some embodiments, the vector may be a matrix (i.e. an n×m vector where n>1 and m>1). For example, CIM module 530A may include an analog static random access memory (SRAM) having multiple SRAM cells and configured to provide output(s) (e.g. voltage(s)) corresponding to the data (weight/parameter) stored in each cell of the SRAM multiplied by a corresponding element of the input vector. In some embodiments CIM module 530A may include a digital static SRAM having multiple SRAM cells and configured to provide output(s) corresponding to the data (weight/parameter) stored in each cell of the digital SRAM multiplied by a corresponding element of the input vector. In some embodiments, CIM module 530A may include an analog resistive random access memory (RAM) configured to provide output (e.g. voltage(s)) corresponding to the impedance of each cell multiplied by the corresponding element of the input vector. Other configurations of CIM module 530 are possible. Each CIM module 530A thus stores weights corresponding to a matrix in its cells and is configured to perform a vector-matrix multiplication of the matrix with an input vector.

In order to facilitate on-chip learning, LU module 540A may be provided. LU module 540A is coupled with the corresponding CIM module 530A. LU module 540A is used to update the weights (or other data) stored in CIM module 530A. LU module 540A is considered local because LU module 540A is in proximity with CIM module 530A. For example, LU module 540A may reside on the same integrated circuit as CIM module 530A. In some embodiments LU module 540A for a particular compute engine resides in the same integrated circuit as the CIM module 530A. In some embodiments, LU module 540A is considered local because it is fabricated on the same substrate (e.g. the same silicon wafer) as the corresponding CIM module 530A. In some embodiments, LU module 540A is also used in determining the weight updates. In other embodiments, a separate component may calculate the weight updates. For example, in addition to or in lieu of LU module 540A, the weight updates may be determined by a GP processor, in software by other processor(s) not part of compute engine 500A and/or the corresponding AI accelerator (e.g. compute tile 100, 200, or 300), by other hardware that is part of compute engine 500A and/or the corresponding AI accelerator (e.g. compute tile 100, 200, or 300), by other hardware outside of compute engine 500A or the corresponding AI accelerator (e.g. compute tile 100, 200, or 300), and/or some combination thereof.

Using compute engine 500A in the context of compute tiles 100, 200, or 300 and/or an analogous system, efficiency and performance of a learning network may be improved. Use of CIM modules 530A may dramatically reduce the time to perform the vector-matrix multiplication that provides the weighted signal. Thus, performing inference(s) using compute engine 500A may require less time and power. This may improve efficiency of training and use of the model. LU modules 540A allow for local updates to the weights in CIM modules 530A. This may reduce the data movement that may otherwise be required for weight updates. Consequently, the time taken for training may be greatly reduced. In some embodiments, the time taken for a weight update using LU modules 540A may be an order of magnitude less (i.e. require one-tenth the time) than if updates are not performed locally. Efficiency and performance of a learning network provided using system 100 may be increased.

Figure 8:
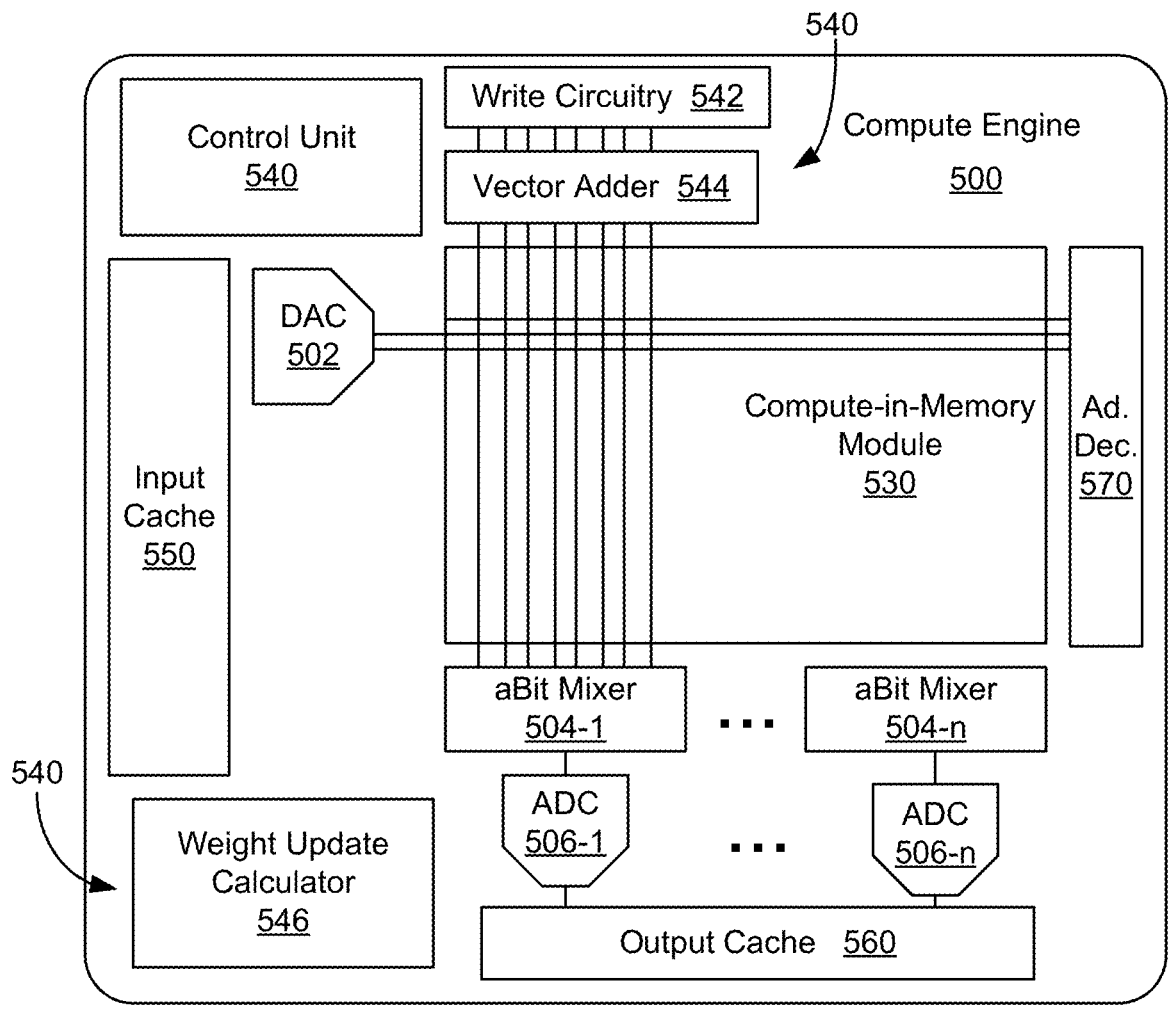
FIG. 8 depicts an embodiment of a portion of a compute engine usable in an AI accelerator and capable of performing local updates.

FIG. 8 depicts an embodiment of compute engine 500 usable in an AI accelerator and capable of performing local updates. Compute engine 500 may be a hardware compute engine analogous to compute engine 500A. Compute engine 500 thus includes CIM module 530 and LU module 540 analogous to CIM modules 530A and LU modules 540A, respectively. Compute engine 500 also includes analog bit mixer (aBit mixer) 504-1 through 504-*n* (generically or collectively 504), analog to digital converter(s) (ADC(s)) 506-1 through 506-*n* (generically or collectively 506), input cache 550, output cache 560, and address decoder 570. Although particular numbers of components 502, 504, 506, 530, 540, 542, 544, 546, 560, and 570 are shown, another number of one or more components 502, 504, 506, 530, 540, 542, 544, 546, 560, and 570 may be present.

CIM module 530 is a hardware module that stores data corresponding to weights and performs vector-matrix multiplications. The vector is an input vector provided to CIM module 530 (e.g. via input cache 550) and the matrix includes the weights stored by CIM module 530. In some embodiments, the vector may be a matrix. Examples of embodiments CIM modules that may be used in CIM module 530 are depicted in FIGS. 9 and 10.

Figure 9:
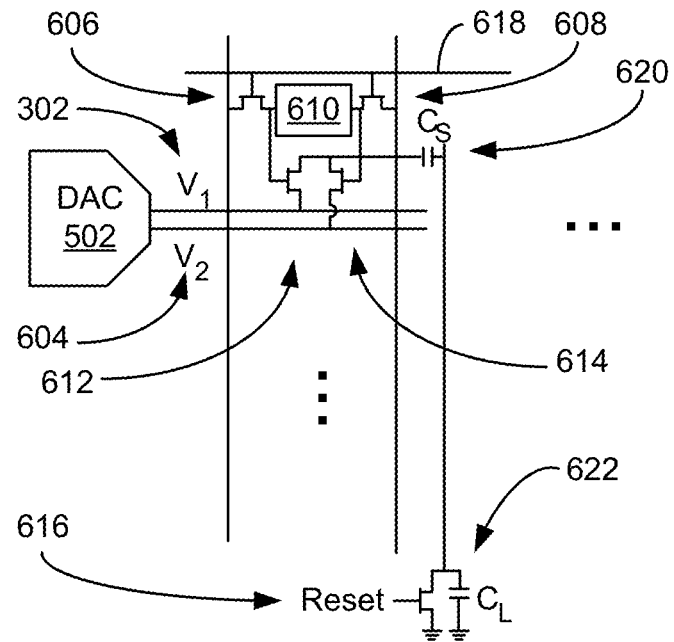
FIG. 9 depicts an embodiment of a portion of a compute-in-memory module usable in an AI accelerator. (SRAM)

FIG. 9 depicts an embodiment of a cell in one embodiment of an SRAM CIM module usable for CIM module 530. Also shown is DAC 502 of compute engine 500. For clarity, only one SRAM cell 610 is shown. However, multiple SRAM cells 610 may be present. For example, multiple SRAM cells 610 may be arranged in a rectangular array. An SRAM cell 610 may store a weight or a part of the weight. The CIM module shown includes lines 602, 604, and 618, transistors 606, 608, 612, 614, and 616, capacitors 620 ($C_S$) and 622 ($C_L$). In the embodiment shown in FIG. 9, DAC 502 converts a digital input voltage to differential voltages, $V_1$ and $V_2$, with zero reference. These voltages are coupled to each cell within the row. DAC 502 is thus used to temporal code differentially. Lines 602 and 604 carry voltages $V_1$ and $V_2$, respectively, from DAC 502. Line 618 is coupled with address decoder 570 (not shown in FIG. 9) and used to select cell 610 (and, in the embodiment shown, the entire row including cell 610), via transistors 606 and 608.

In operation, voltages of capacitors 620 and 622 are set to zero, for example via Reset provided to transistor 616. DAC 502 provides the differential voltages on lines 602 and 604, and the address decoder (not shown in FIG. 9) selects the row of cell 610 via line 618. Transistor 612 passes input voltage $V_1$ if SRAM cell 610 stores a logical 1, while transistor 614 passes input voltage $V_2$ if SRAM cell 610 stores a zero. Consequently, capacitor 620 is provided with the appropriate voltage based on the contents of SRAM cell 610. Capacitor 620 is in series with capacitor 622. Thus, capacitors 620 and 622 act as capacitive voltage divider. Each row in the column of SRAM cell 610 contributes to the total voltage corresponding to the voltage passed, the capacitance, $C_S$, of capacitor 620, and the capacitance, $C_L$, of capacitor 622. Each row contributes a corresponding voltage to the capacitor 622. The output voltage is measured across capacitor 622. In some embodiments, this voltage is passed to the corresponding aBit mixer 504 for the column. In some embodiments, capacitors 620 and 622 may be replaced by transistors to act as resistors, creating a resistive voltage divider instead of the capacitive voltage divider. Thus, using the configuration depicted in FIG. 9, CIM module 530 may perform a vector-matrix multiplication using data stored in SRAM cells 610.

Figure 10:
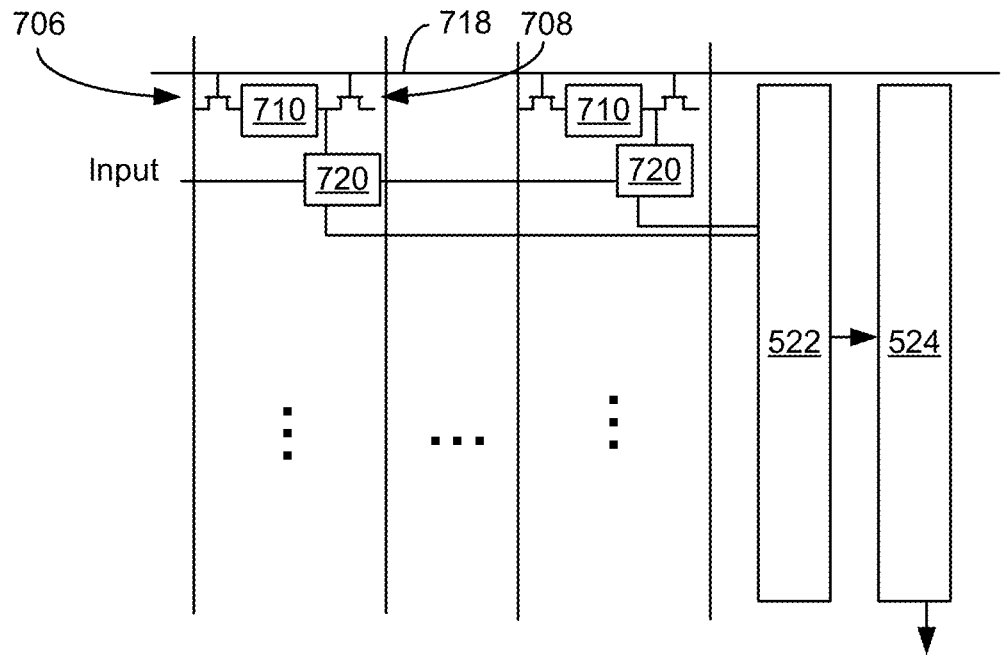
FIG. 10 depicts an embodiment of a portion of a compute-in-memory module usable in an AI accelerator. (SRAM)

FIG. 10 depicts an embodiment of a cell in one embodiment of a digital SRAM module usable for CIM module 530. For clarity, only one digital SRAM cell 710 is labeled. However, multiple cells 710 are present and may be arranged in a rectangular array. Also labeled are corresponding transistors 706 and 708 for each cell, line 718, logic gates 720, adder tree 722 and digital mixer 724. Because the SRAM module shown in FIG. 10 is digital, DACs 502, aBit mixers 504, and ADCs 506 may be omitted from compute engine 500 depicted in FIG. 8.

In operation, a row including digital SRAM cell 710 is enabled by address decoder 570 (not shown in FIG. 10) using line 718. Transistors 706 and 708 are enabled, allowing the data stored in digital SRAM cell 710 to be provided to logic gates 720. Logic gates 720 combine the data stored in digital SRAM cell 710 with the input vector. Thus, the binary weights stored in digital SRAM cells 710 are combined with the binary inputs. The output of logic gates 720 are accumulated in adder tree 722 and combined by digital mixer 724. Thus, using the configuration depicted in FIG. 10, CIM module 530 may perform a vector-matrix multiplication using data stored in digital SRAM cells 710.

Referring back to FIG. 8, CIM module 530 thus stores weights corresponding to a matrix in its cells and is configured to perform a vector-matrix multiplication of the matrix with an input vector. In some embodiments, compute engine 500 stores positive weights in CIM module 530. However, the use of both positive and negative weights may be desired for some models and/or some applications. In such cases, bipolar weights (e.g. having range −S through +S) are mapped to a positive range (e.g. 0 through S). For example, a matrix of bipolar weights, W, may be mapped to a positive weight matrix $W_p$ such that: $Wx=(W_p-SJ/2)(2x)=5W_px-S\Sigma_i x_i$, where J is a matrix of all ones having the same size as W and S is the maximum value of the weight (e.g. $2^{N-1}-1$ for an N-bit weight). For simplicity, compute engine 500 is generally discussed in the context of CIM module 530 being an analog SRAM CIM module analogous to that depicted in FIG. 9.

Input cache 550 receives an input vector for which a vector-matrix multiplication is desired to be performed. In some embodiments, the input vector is provided to input cache by a GP processor, such as GP processor 110. The input vector may be read from a memory, from a cache or register in the processor, or obtained in another manner. Digital-to-analog converter (DAC) 502 converts a digital input vector to analog in order for CIM module 530 to operate on the vector. Although shown as connected to only some portions of CIM module 530, DAC 502 may be connected to all of the cells of CIM module 530. Alternatively, multiple DACs 502 may be used to connect to all cells of CIM module 530. Address decoder 570 includes address circuitry configured to selectively couple vector adder 544 and write circuitry 542 with each cell of CIM module 530. Address decoder 570 selects the cells in CIM module 530. For example, address decoder 570 may select individual cells, rows, or columns to be updated, undergo a vector-matrix multiplication, or output the results. In some embodiments, aBit mixer 504 combines the results from CIM module 530. Use of aBit mixer 504 may save on ADCs 506 and allows access to analog output voltages.

ADC(s) 506 convert the analog resultant of the vector-matrix multiplication to digital form. Output cache 560 receives the result of the vector-matrix multiplication and outputs the result from compute engine 500. Thus, a vector-matrix multiplication may be performed using CIM module 530.

LU module 540 includes write circuitry 542 and vector adder 544. In some embodiments, LU module 540 includes weight update calculator 546. In other embodiments, weight update calculator 546 may be a separate component and/or may not reside within compute engine 500. Weigh update calculator 546 is used to determine how to update to the weights stored in CIM module 530. In some embodiments, the updates are determined sequentially based upon target outputs for the learning system of which compute engine 500 is a part. In some embodiments, the weight update provided may be sign-based (e.g. increments for a positive sign in the gradient of the loss function and decrements for a negative sign in the gradient of the loss function). In some embodiments, the weight update may be ternary (e.g. increments for a positive sign in the gradient of the loss function, decrements for a negative sign in the gradient of the loss function, and leaves the weight unchanged for a zero gradient of the loss function). Other types of weight updates may be possible. In some embodiments, weight update calculator 546 provides an update signal indicating how each weight is to be updated. The weight stored in a cell of CIM module 530 is sensed and is increased, decreased, or left unchanged based on the update signal. In particular, the weight update may be provided to vector adder 544, which also reads the weight of a cell in CIM module 530. More specifically, adder 544 is configured to be selectively coupled with each cell of CIM module by address decoder 570. Vector adder 544 receives a weight update and adds the weight update with a weight for each cell. Thus, the sum of the weight update and the weight is determined. The resulting sum (i.e. the updated weight) is provided to write circuitry 542. Write circuitry 542 is coupled with vector adder 544 and the cells of CIM module 530. Write circuitry 542 writes the sum of the weight and the weight update to each cell. In some embodiments, LU module 540 further includes a local batched weight update calculator (not shown in FIG. 8) coupled with vector adder 544. Such a batched weight update calculator is configured to determine the weight update.

Compute engine 500 may also include control unit 540. Control unit 540 generates the control signals depending on the operation mode of compute engine 500. Control unit 540 is configured to provide control signals to CIM hardware module 530 and LU module 549. Some of the control signals correspond to an inference mode. Some of the control signals correspond to a training, or weight update mode. In some embodiments, the mode is controlled by a control processor (not shown in FIG. 8, but analogous to processor 110) that generates control signals based on the Instruction Set Architecture (ISA).

In inference mode, the input data is multiplied by the stored weights and output is obtained after ADC 506. This mode may include many steps. For example, if capacitors arranged in a voltage divider are used to provide the output (e.g. in FIG. 9), the capacitors (or other storage elements) may be reset. For example, capacitors are rest to either zero or certain precharge value depending on the functionality of the capacitor. Capacitive voltage divider operation is enabled to provide the output of the vector-matrix-multiplication. aBit mixer 504 is enabled. ADC(s) 506 are also enabled. Data are stored in output cache 560 to be passed to the compute engine or other desired location(s). This process may be repeated for the entire vector multiplication. In weight update mode, the weight update signals may be generated sequentially by weight update calculator 546. In parallel, cells in a row of CIM module 530 are read row by row and passed to adder 544 for the corresponding weight update.

Using compute engine 500, efficiency and performance of a learning network may be improved. CIM module 530 may dramatically reduce the time to perform the vector-matrix multiplication. Thus, performing inference(s) using compute engine 500 may require less time and power. This may improve efficiency of training and use of the model. LU module 540 uses components 542, 544, and 546 to perform local updates to the weights stored in the cells of CIM module 530. This may reduce the data movement that may otherwise be required for weight updates. Consequently, the time taken for training may be dramatically reduced. Efficiency and performance of a learning network provided using compute engine 500 may be increased.

Figure 11:
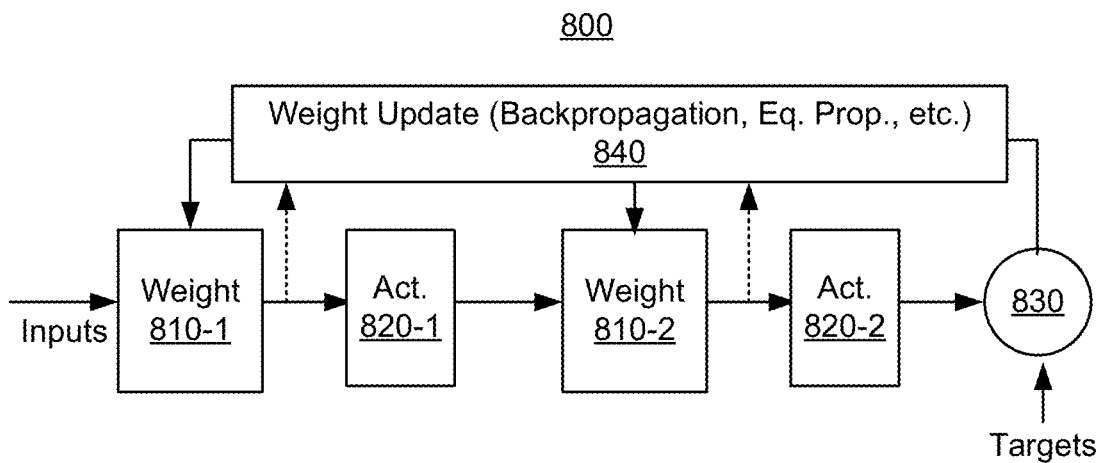
FIG. 11 depicts an embodiment of the data flow in a learning network.

For example, FIG. 11 depicts an embodiment of data flow in learning network 800 that can be implemented using compute tile 100, 200, and/or 300 and/or compute engine(s) 500A and/or 500. Learning network 800 includes weight layers 810-1 and 810-2 (collectively or generically 810) and activation layers 820-1 and 820-2 (collectively or generically 820). For training, loss function calculator 830 as well as weight update block 840 are shown. Weight update block 840 might utilize techniques including but not limited to back propagation, equilibrium propagation, feedback alignment and/or some other technique (or combination thereof). In operation, an input vector is provided to weight layer 810-1. A first weighted output is provided from weight layer 810-1 to activation layer 820-1. Activation layer 820-1 applies a first activation function to the first weighted output and provides a first activated output to weight layer 820-2. A second weighted output is provided from weight layer 810-2 to activation layer 820-2. Activation layer 820-2 applies a second activation function to the second weighted output. The output is provided to loss calculator 830. Using weight update technique(s) 840, the weights in weight layer(s) 810 are updated. This continues until the desired accuracy is achieved.

Compute tile(s) 100, 200, and/or 300 and compute engine(s) 120, 220, 320, 500A, and/or 500 may be used to accelerate the processes of learning network 800. For simplicity, it is assumed that compute engine 500 is used in compute tile 300. Further, weight layers 810 are assumed to be storable within a single CIM module 530. Nothing prevents weight layers 810 from being extended across multiple CIM modules 530. In the data flow described above for learning network 800, an input vector is provided to a compute engine 320-1 from GP processor 310. More specifically, the input vector is provided to CIM module 530 (e.g. via input cache 550 and DAC(s) 502). Initial values of weights are stored in, for example, SRAM cells (e.g. 610 or 710) of CIM module 530. A vector matrix multiplication is performed by CIM module 530 and provided to output cache 560 (e.g. also using aBit mixers 504 and ADC(s) 506). Thus, the processes of weight layer 810-1 may be performed. Activation layer 820-1 may be performed using a GP processor 310. The output of activation layer 820-1 (e.g. from GP processor 310) is provided to the next weight layer 810-2. Initial weights for weight layer 810-2 may be in another compute engine 330-2/CIM module 530. In another embodiment, new weights corresponding to weight layer 810-2 may be stored in the same hardware CIM module 530 of the same compute engine 330-1. A vector matrix multiplication is performed by CIM module 530 and provided to output cache 560 (e.g. also using aBit mixers 504 and ADC(s) 506). Activation layer 820-2 may be performed using a processor such as GP processor 310. The output of activation layer 820-2 is used to determine the loss function via hardware or GP processor 310. The loss function may be used to determine the weight updates by GP processor 310, weight update calculator 546/800. Using LU modules 540 and the weights in CIM modules 530, weight layers 810 may be updated. Thus, learning network 800 may be realized using compute tile 100, 200, and/or 300 and/or compute engine 500. The benefits thereof may, therefore, be obtained.

Figure 12A:
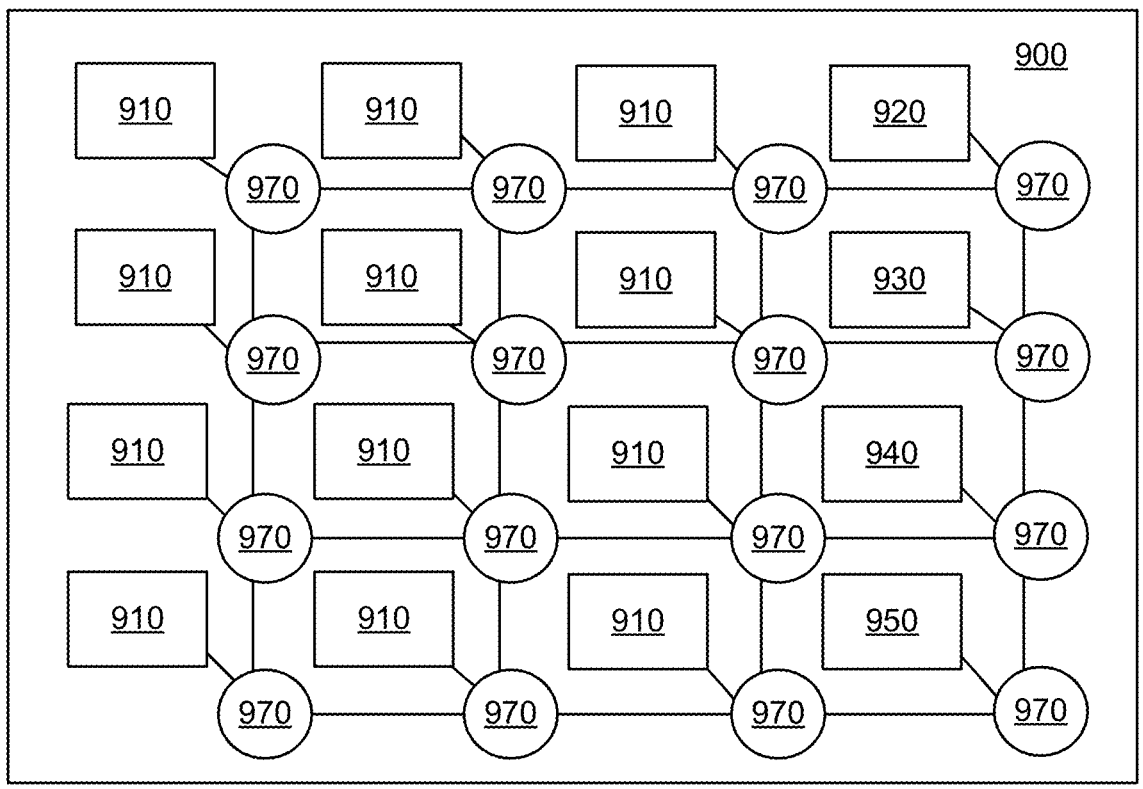
FIGS. 12A-12C depict an embodiment of an architecture including compute engines and usable in an AI accelerator.
Figure 12B:
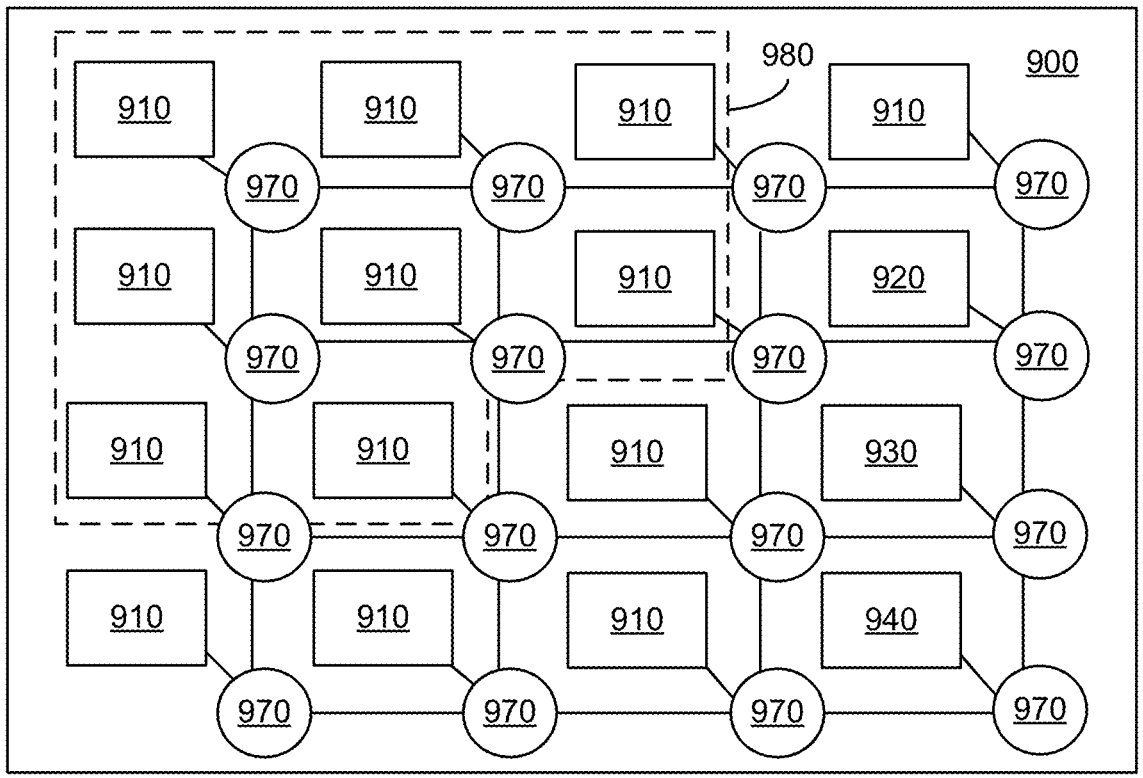
Figure 12C:
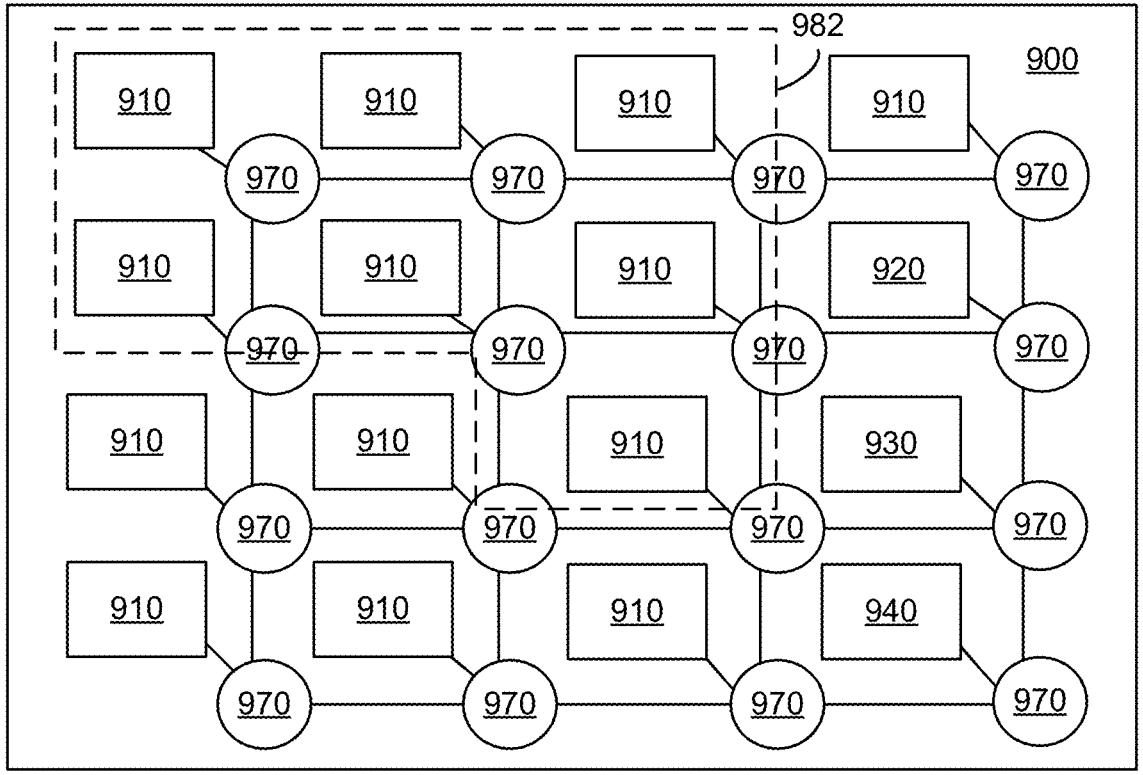

Compute engines 120, 220, 320, 500A and/or 500 may be combined in a variety of architectures. For example, FIGS. 12A-12C depict an embodiment of an architecture including multiple compute tiles 910, each of which is analogous to compute tile(s) 100, 200, and/or 300. An AI accelerator may include or be architecture 900. In some embodiments, architecture 900 may be considered a system on a chip (SoC) or a network on a chip (NoC). SoC 900 includes compute tiles 910, a DDR controller 920, PCIe or other analogous module 930, peripheral I/O module 940, management control processor (MCP) 950, and routers/mesh interconnects 970. Other and/or different components may be included. DDR controller 920 allows for DRAM (not shown) to be coupled with SoC 900. PCIe module 930 allows for connectivity to a host (not shown). Peripheral I/O module 940 may be merged with MCP 950 in some embodiments. MCP 950 may perform housekeeping and other management functions for SoC 900. Via routers/mesh interconnects 970 and modules such as mesh stops, such as mesh stops 280 and/or 380, tiles 910 may be interconnected.

In SoC 900, each tile 910 is an independent compute unit which has its own local memory analogous to SRAM 130, 230, and/or 330. Tiles 910 may be interconnected by mesh interconnects. In some embodiments, this allows any tile 910 to access the memory of any other tile 910. Tiles 910 each have memory that is fully globally addressable. In some embodiments, a tile 910 may interact with any other tile 910 of SoC 900. Thus, tiles 920 may be considered to be tightly-coupled, independent compute and memory blocks with globally addressable memory that enable a compiler (not shown in FIGS. 12A-12C) to create custom super tiles. Super tiles can be formed by some combination of two or more tiles 910. For example, FIG. 12B depicts SoC 900 in which super tile 980 has been formed from eight tiles 910. Similarly, FIG. 12C depicts SoC 900 in which super tile 982 has been formed from seven tiles 910. Other supertiles may be formed. Super tiles may be used to create custom pipelines for scheduling computational graphs for execution using SoC 900 and/or for other purposes. In some embodiments, for example, an arbitrary computational graph can be mapped to SoC 900 via super tiles. The mesh interconnection of tiles 900 in SoC may reflects the custom traffic patterns observed on SoC 900. The custom traffic patterns might require support for multicast, broadcast for various operators (e.g. BatchNorm). In other embodiments, other and/or additional features may be supported based upon the traffic patterns.

Using SoC 900 efficiency and performance of a learning network may be improved. In addition to the benefits of the individual tiles 900, such as more efficient control and movement of data within a tile, SoC 900 may extend the benefits to larger systems. Through super tiles, SoC 900 may be tailored to the specific traffic patterns and applications with which SoC 900 is desired to be used. Further, the communication between tiles 910 may be facilitated by bypassing GP processors and allowing for direct movement of data between components of different tiles 910. Consequently, efficiency and performance may be enhanced.

Figure 13:
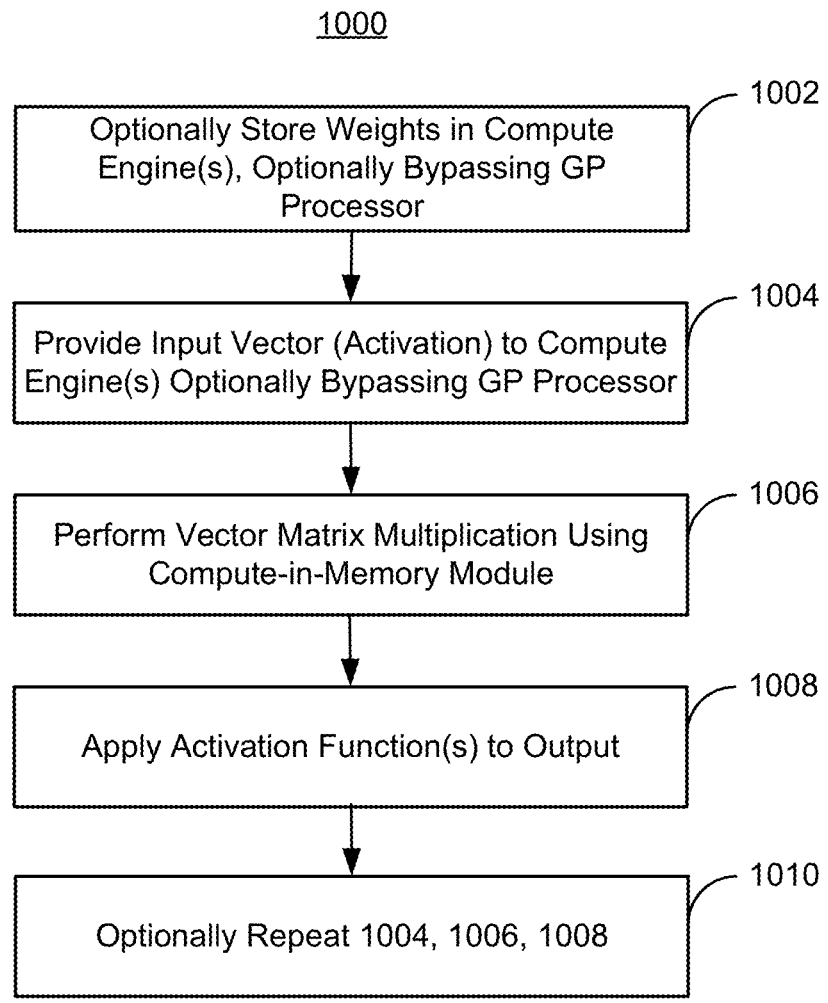
FIG. 13 is a flow chart depicting one embodiment of a method for using a compute engine usable in an AI accelerator.

FIG. 13 is a flow chart depicting one embodiment of method 1000 for using a compute engine usable in an AI accelerator for training. Method 1000 is described in the context of compute tile 100 and compute engine 500. However, method 1000 is usable with other compute tiles, such as compute tiles 200, 300, 300', 300", and/or 400 and/or other compute engines, such as engine 500A. Although particular processes are shown in an order, the processes may be performed in another order, including in parallel. Further, processes may have substeps.

Weights corresponding to a weight matrix may be stored in one or more compute engines of a compute tile, at 1002. In some embodiments, this occurs at a time that is distinct from the remainder of method 1000. In some embodiments, 1002 includes storing the weights in the CIM hardware module of the compute engine of the compute tile. In some embodiments, 1002 may include movement of weights to the compute engines without requiring that the weights be first stored in the GP processor of the compute tile. An input vector is provided to the compute engine(s) of the compute tile, at 1004. In some embodiments, this is performed via the GP processor corresponding to the compute tile. In some embodiments, the input vector is provided to the compute engine via a data path that bypasses the GP processor. For example, the input vector may be provided from the memory on the compute tile or a component (memory or a GP processor) of another tile.

The compute engine(s) perform a VMM between the input vector and the matrix, at 1006. In some embodiments, this is performed by the CIM hardware module. Thus, 1006 provides an output that is the weight matrix multiplied by the input vector. One or more activation functions are applied to the output, at 1008. In some embodiments, 1008 is performed by the GP processor for the compute tile. At 1010, 1004, 1006, and 1008 may be repeated for multiple inferences with the same or other compute engines (e.g. other weight matrices).

For example, weights may be stored in the compute engines 120 of compute tile 100, at 1002. For example, data may be stored in SRAM cells 610 of CIM hardware modules 530 of compute engine 500. During inference or training, an input vector is provided to compute engine(s) 120. For example, an input vector stored in memory 130 may be provided to GP processor 110, and from GP processor 110 to the appropriate compute engine(s) 120. In some embodiments, the input vector stored in memory 330 or off tile may be provided to the appropriate compute engine(s) without first being stored in GP processor 110. GP processor may instruct compute engine(s) 120 to perform a VMM of the input vector and the weight matrix stored in compute engine(s) 120. Thus, at 1006, compute engine(s) 120 perform VMM in parallel. For example, compute engine 500 may use CIM hardware module 530 to perform a VMM. Also at 1006, the output of the VMM is provided to GP processor 110 or another component such as memory 130 or a GP processor of another tile. Activation function(s) are applied to the output, at 1008. This may be performed by GP processor 110. In some embodiments, a fixed function computing block (e.g. a lookup table) may be used in accomplishing 1008. The resultant of the activation function being applied to the output of compute engines 120 may be stored by GP processor 110 in memory 130. At 1008, these processes may be repeated. Thus, inferences may be improved. Further, training may be performed on-chip using the resultants of method 1000 and, for example, LU modules 540A and/or 540.

Using method 1000, the benefits of compute tiles 100, 200, 300, 300', 300" and/or 400 may be achieved. For example, efficiency and performance of learning may be improved. The time to perform the VMMs may be reduced and the movement of data made more efficient. This may improve efficiency of training and use of the model. Efficiency and performance of a learning network provided using method 1000 may be increased.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A compute tile, comprising:
 a plurality of compute engines, each of the plurality of compute engines including a compute-in-memory (CIM) hardware module, the CIM hardware module being configured to store a plurality of weights corresponding to a matrix and to perform a vector-matrix multiplication (VMM) for the matrix;
 a general-purpose (GP) processor coupled with the plurality of compute engines and configured to control the plurality of compute engines, to receive output of the VMM for the matrix from each of the plurality of compute engines, and to perform a nonlinear operation on the output, the GP processor including a fixed function computing block usable in performing the nonlinear operation, the nonlinear operation corresponding to an activation function for the output of the VMM; and
 a data conversion engine coupled with the plurality of compute engines and configured to convert data transferred to the plurality of compute engines from a first format to a second format, wherein the data was received from another compute tile in the first format;
 wherein the plurality of compute engines is addressable by a plurality of data movement initiators and by the GP processor.

2. The compute tile of claim 1, wherein the plurality of compute engines and the plurality of data movement initiators are configured to at least one of move data to the plurality of compute engines in a data path bypassing the GP processor or move data from the plurality of compute engines in a data path bypassing the GP processor of the compute tile.

3. The compute tile of claim 1, further comprising:
 a direct memory access (DMA) unit, the plurality of data movement initiators including at least one of the DMA unit or a component on an additional compute tile coupled with the compute tile.

4. The compute tile of claim 3, further comprising:
 a local memory coupled with the plurality of compute engines and the GP processor, the DMA unit being configured to transfer data between the local memory and the plurality of compute engines in a data path bypassing the GP processor.

5. The compute tile of claim 1, wherein the data conversion engine includes at least one of a BFloat-Integer format converter or a reshape engine, the reshape engine configured to pad the data.

6. The compute tile of claim 1, further comprising:
 a local memory coupled with the plurality of compute engines through a first bus, the GP processor being coupled with the plurality of compute engines through a second bus different from the first bus; and
 a main bus coupled with the local memory and the GP processor.

7. The compute tile of claim 1, further comprising:
 a local memory coupled with the plurality of compute engines by a first bus; and a main bus coupled with the local memory, the plurality of compute engines, and the GP processor, the GP processor being coupled with the plurality of compute engines and the local memory through the main bus.

8. The compute tile of claim 7, wherein the plurality of compute engines is coupled to the main bus through an interconnect having an internal queueing.

9. The compute tile of claim 1, wherein the compute tile further includes:
  a local compute engine memory having a first memory density; and
  a cache controller coupled with the local compute engine memory;
  wherein the CIM hardware module is coupled with the cache controller and has a second memory density less than the first memory density.

10. A system, comprising:
  a plurality of compute tiles, each of the plurality of compute tiles including a plurality of compute engines and a general-purpose (GP) processor, each of the plurality of compute engines including a compute-in-memory (CIM) hardware module, the CIM hardware module being configured to store a plurality of weights corresponding to a matrix and to perform a vector-matrix multiplication (VMM) for the matrix, the GP processor being coupled with the plurality of compute engines and being configured to control the plurality of compute engines, to receive output of the VMM for the matrix from each of the plurality of compute engines, and to perform a nonlinear operation on the output, the GP processor including a fixed function computing block usable in performing the nonlinear operation, the plurality of compute tiles including a first compute tile and a second compute tile, the nonlinear operation corresponding to an activation function for the VMM; and
  a data conversion engine coupled with the plurality of compute engines of the first compute tile and configured to convert data transferred to the plurality of compute engines from a first format to a second format, wherein the data was received from the second compute tile in the first format;
  wherein the plurality of compute engines is addressable by a plurality of data movement initiators on the plurality of compute tiles and by the GP processor, the plurality of data movement initiators being configured to move data to the plurality of compute engines on a the first compute tile of the plurality of compute tiles in a data path bypassing the GP processor on the first compute tile.

11. A method, comprising:
  providing an input vector to at least one compute engine, the at least one compute engine being part of a plurality of compute engines on a first compute tile of a plurality of compute tiles, the plurality of compute engines being coupled with a general-purpose (GP) processor on the first compute tile, the at least one compute engine storing a plurality of weights corresponding to a matrix, each of the plurality of compute engines including a compute-in-memory (CIM) hardware module, the CIM hardware module of the at least one compute engine being configured to store the plurality of weights in a plurality of storage cells and to perform a vector-matrix multiplication (VMM) of the matrix and the input vector, the at least one compute engine performing the VMM for the input vector and the matrix to provide an output, the CIM hardware module configured to perform the VMM by a bit-wise multiplication of the plurality of weights stored in the plurality of storage cells of the CIM hardware module and elements of the input vector;
  applying, by the GP processor, a function to the output, the GP processor being configured to control the plurality of compute engines, the GP processor including a fixed function computing block usable in performing the function, the function being a nonlinear activation function for the VMM; and
  converting data transferred to the plurality of compute engines of the first compute tile from a first format to a second format, wherein the data was received from a second compute tile of the plurality of compute tiles in the first format;
  wherein the plurality of compute engines is addressable by a plurality of data movement initiators and by the GP processor such that the providing the input vector includes providing the input vector to the at least one compute engine by a data movement initiator of the plurality of data movement initiators in a data path that bypasses the GP processor or providing the input vector to the at least one compute engine by the GP processor.

12. The method of claim 11, further comprising:
  moving data from the CIM hardware module to the at least one compute engine;
  wherein the data is moved from the CIM hardware module to the at least one compute engine via at least one data path bypassing the GP processor.

13. The method of claim 11, wherein the providing the input vector further includes:
  using at least one of a direct memory access (DMA) unit, the plurality of data movement initiators including the DMA unit, or a component on a third compute tile coupled with the first compute tile.

14. The method of claim 11, wherein a local memory is coupled with the plurality of compute engines through a first bus, the GP processor is coupled with the plurality of compute engines through a second bus different from the first bus, and a main bus is coupled with the local memory and the GP processor.

15. The method of claim 11, wherein a local memory is coupled with the plurality of compute engines by a first bus and wherein a main bus is coupled with the local memory, the plurality of compute engines, and the GP processor, the GP processor being coupled with the plurality of compute engines and the local memory through the main bus.

16. The method of claim 15, wherein the plurality of compute engines is coupled to the main bus through an interconnect having an internal queueing.

17. The method of claim 11, wherein each of the plurality of compute tiles further includes a local compute engine memory having a first memory density and a cache controller coupled with the local compute engine memory, and wherein the CIM hardware module is coupled with the cache controller and has a second memory density less than the first memory density.

18. The compute tile of claim 1, wherein the GP processor is reduced instruction set computer (RISC) processor configured as a separate data movement initiator providing data to the plurality of compute engines, the data including a vector for the VMM.

19. The compute tile of claim 1, wherein each of the plurality of compute engines includes a local update module configured to update at least one weight of the plurality of weights in the CIM hardware module.

20. The compute tile of claim 1, further comprising:
a local memory coupled with the GP processor;
wherein each compute engine of the plurality of compute engines is coupled with a local compute engine memory, the local compute engine memory having a first memory density;
wherein each compute engine of the plurality of compute engines is coupled to a cache controller, the cache controller being coupled with the local compute engine memory;
wherein the CIM hardware module of each compute engine is coupled with the cache controller and has a second memory density less than the first memory density.

21. The compute tile of claim 1, wherein the GP processor is a single GP processor for the compute tile, the single GP processor controlling the plurality of compute engines.

\* \* \* \* \*